(12) United States Patent
Youd et al.

(10) Patent No.: US 7,370,855 B2
(45) Date of Patent: May 13, 2008

(54) SPRING DAMPER

(76) Inventors: Jason B. Youd, 7785 Haley Rd., White Lake, MI (US) 48383; Derek Saynor, 54818 Walnut Dr., New Hudson, MI (US) 48165

( * ) Notice: Subject to any disclaimer, the term of this patent is extended or adjusted under 35 U.S.C. 154(b) by 32 days.

(21) Appl. No.: 11/270,159

(22) Filed: Nov. 9, 2005

(65) Prior Publication Data
US 2006/0163786 A1  Jul. 27, 2006

Related U.S. Application Data

(60) Provisional application No. 60/647,247, filed on Jan. 25, 2005.

(51) Int. Cl.
*F16F 1/06* (2006.01)

(52) U.S. Cl. .................................... 267/179; 267/204

(58) Field of Classification Search ............... 267/166, 267/167, 170, 171, 174, 178, 179, 90, 94, 267/216, 291, 204, 286; 123/90.65
See application file for complete search history.

(56) References Cited

U.S. PATENT DOCUMENTS

| | | | |
|---|---|---|---|
| 1,191,658 A | 7/1916 | Brown | |
| 1,696,797 A | 12/1928 | Fornaca | |
| 1,746,220 A | 2/1930 | Manning | |
| 1,928,678 A | 10/1933 | Sjolander | |
| 1,988,341 A * | 1/1935 | Sjolander | 267/135 |
| 2,005,089 A | 6/1935 | Krebs | |
| 2,042,647 A * | 6/1936 | Wine | 267/204 |
| 2,117,433 A | 5/1938 | Krebs | |
| 2,396,347 A | 3/1946 | Sanders | |
| 2,775,445 A * | 12/1956 | Goodloe | 267/204 |
| 2,821,971 A | 2/1958 | Benz et al. | |
| 3,110,298 A | 11/1963 | Giles | |
| 3,198,188 A | 8/1965 | Heid | |
| 3,326,562 A | 6/1967 | Devring | |
| 3,336,913 A | 8/1967 | McCormick | |
| 3,459,166 A | 8/1969 | Updike et al. | |
| 4,317,436 A | 3/1982 | Barnhart et al. | |
| 4,470,383 A | 9/1984 | DeBolt | |
| 4,479,461 A | 10/1984 | Felice et al. | |
| 4,538,563 A | 9/1985 | Mayers | |
| 4,579,017 A * | 4/1986 | Nusser | 74/519 |
| 4,582,653 A * | 4/1986 | Blanchard et al. | 261/65 |
| 4,732,372 A * | 3/1988 | Dickhart et al. | 267/204 |
| 4,830,348 A * | 5/1989 | Seyler | 267/166 |
| 4,993,376 A | 2/1991 | Fukutome et al. | |
| 5,246,215 A | 9/1993 | Takamura et al. | |
| 5,322,039 A | 6/1994 | Kinsey | |
| 2004/0222579 A1 | 11/2004 | Adoline et al. | |

* cited by examiner

*Primary Examiner*—Xuan Lan Nguyen
(74) *Attorney, Agent, or Firm*—Ronald R. Kilponen

(57) ABSTRACT

A damper is shown for damping the movements of a valve spring in an engine. The valve spring can be housed within the damper or the damper may be located inside of the valve spring. The damper is made from a suitable polymer and has one or more slots located radially to a central axis and one or more rings or bands. The rings or bands are located on the outer surface of the damper where the valve spring is located within the damper. The rings or bands are located on the inner surface of the damper where the valve spring surrounds the damper. The cross section, number and location of the slots, rings or bands can be adjusted depending on the particular application of the damper and the amount of damping that is desired for the particular application.

8 Claims, 28 Drawing Sheets

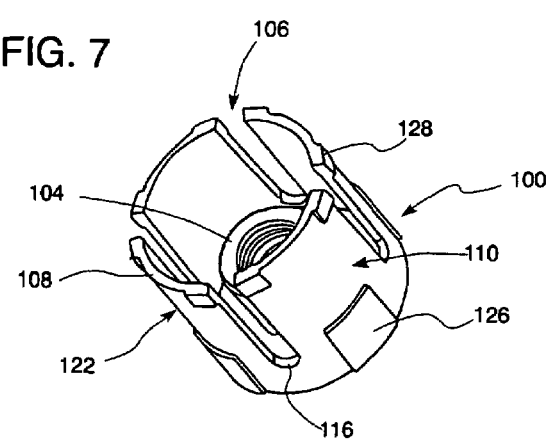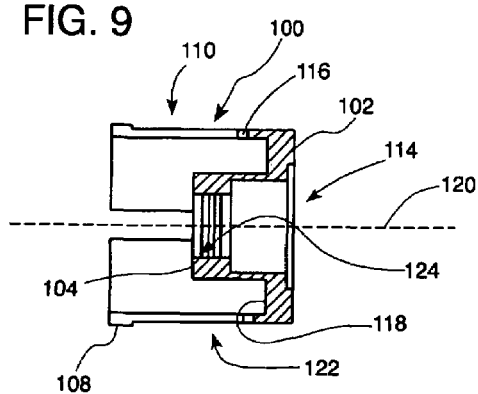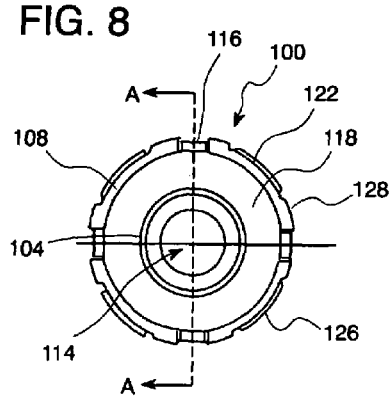

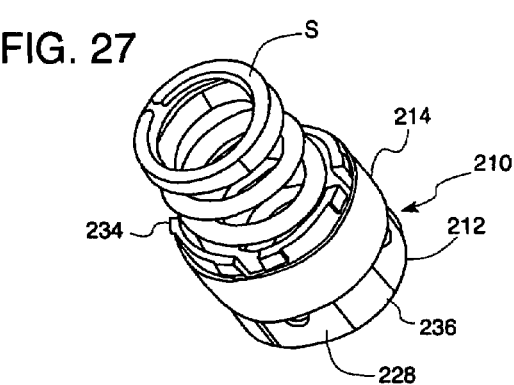
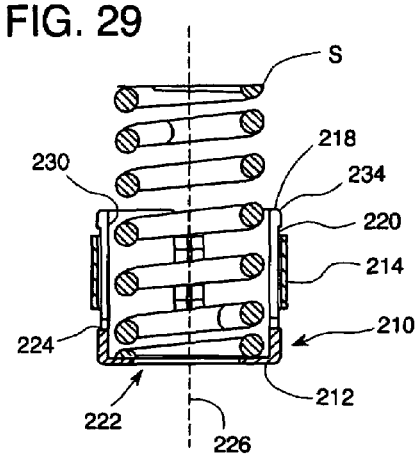
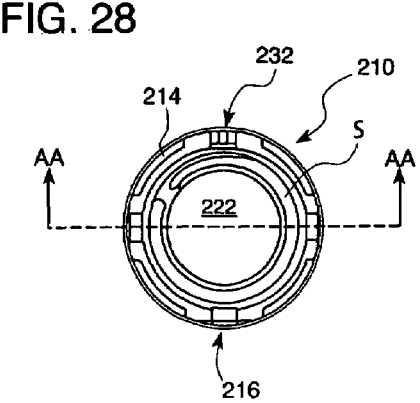

SPRING DAMPER

CROSS REFERENCE TO RELATED APPLICATIONS

This application claims the benefit of Provisional application for Patent Ser. No. 60/647,247 filed on Jan. 25, 2005.

FIELD

The present version of these embodiments relate generally to the field of dampers for springs and more particularly to the damping of valve springs in engines. While valve springs are specifically discussed, these dampers could be used for other applications such as suspension springs, fuel injector springs, clutch springs and others.

BACKGROUND

These embodiments relate to the field of dampers for springs, and more particularly to the damping of valve springs in engines. In order for four cycle internal combustion engines to run there needs to be a way of allowing the fuel-air mixture into the combustion chamber. When the fuel-air mixture has been burned, then the exhausted fuel-air mixture and combustion products must exit the combustion chamber. This has been done in the background art by providing at least one valve that opens and closes to allow the fuel-air mixture into the combustion chamber and traditionally at least one other valve to allow the spent fuel-air mixture and combustion products to leave the combustion chamber. The valves traditionally have springs which interact with the valve and are provided typically with a rotating cam to depress and release the valve.

The valves are opened by having the cam pressing on the valve forcing the valve towards the combustion chamber thus opening the valve and compressing the valve spring. When the valve is released the valve spring moves or returns the valve to the closed position. When the valve is opened the spring compresses and upon release of the valve, the spring returns the valve to the closed position.

This type of system works relatively well for most applications, but today with the smaller higher revolution per minute (rpm) engines, the need for decreased weight in vehicles, the need for higher efficiency engines and other reasons, the current valve spring system is not as desirable. As these smaller engines are operated at higher rpms for longer periods of time, the valves springs do not have time to completely stop oscillating when the valve is fully engaged and when the valve is fully released. This oscillation of the valve springs can lead to leakage when the valve is released and decreased flow when the valve is engaged to allow fuel and air into the cylinder. The valves can also float or flutter, meaning that the valves are not operating as efficiently as would be desired.

One way to discourage the float or flutter is to get the valve and specifically the valve spring to stop oscillating when opened and closed. Once the valve is closed, in a perfect system, both the valve and spring would stop moving. Conversely, once the valve is opened, both the valve and spring would stop moving. This does not occur in the real world and the valve spring continues to move up and down, or oscillate, for a finite time period and then stops. It is desirable to have the spring stop moving as quickly as possible when compressed and also when released.

Much of the background art also uses a separate valve stem seal to discourage the lubricating oil from penetrating into the combustion chamber. It would be beneficial to have this valve stem seal incorporated into a polymer damper to decrease manufacturing costs and also to ease assembly.

The damping of oscillations has traditionally been done by engineering the spring or spring materials to decrease this spring oscillation. Current engineering has reached the limit for damping these oscillations with spring engineering and spring materials. Some background art shows the use of dampers attached to the spring to lessen these oscillations. Much of the art that is known uses a steel damper. A steel damper only provides a point contact between the spring and the damper because of the relative inelasticity of the steel. The applicant uses a polymer for the damper which is then held against the surface of the spring by radial force provided by a band or ring acting as a spring element. A polymer damper can conform to the shape of the spring coils allowing more surface area contact against the damper and hence more efficient damping.

A damper can be any material that will stop a spring from oscillating. Various embodiments have been developed to stop the spring from oscillating such as a dual spring system, installing a damper on the outside of the spring, installing a damper on the inside of the spring. Many of the current systems have significant disadvantages to them that do not allow the optimum damping of the valve springs. These systems can be costly and difficult to install and maintain and some require re-engineering the cam shafts and cylinder heads where the valves and valve springs are located.

For the foregoing reasons, there is a need for a spring damper that will discourage the spring from oscillating when the spring is compressed and released.

SUMMARY

In view of the foregoing disadvantages inherent in the level of the art in valve springs there is a need for a spring damper.

A first object of the these embodiments is to provide a damper that is relatively cost effective to manufacture and install.

Another object of these embodiments is to provide a damper that will provide damping along a radial surface of a spring coil as opposed to a point contact of a spring coil.

Another object of these embodiments is to provide a damper that will dampen the valve spring oscillations more effectively and efficiently than those currently available.

It is yet another object of these embodiments to provide a damper that will have a long life cycle and maintain damping performance over a longer time period without wearing or damage to the spring.

Another object of these embodiments is to provide a damper that will cause less wear to the spring surface with less metal filings from spring wear which can then contaminate the lubrication system of the engine.

Another object of these embodiments is to provide a spring damper that incorporates a valve stem seal to simplify assembly and reduce costs.

It is a still further object of these embodiments is to provide a damper that can be installed without redesigning the valve spring, cylinder head or engine.

These together with other objects of these embodiments, along with various features of novelty which characterize these embodiments, are pointed out with particularity in the detailed description and forming a part of this disclosure. For a better understanding of these embodiments, their operating advantages and the specific objects attained by its uses, reference should be had to the accompanying drawings and descriptive matter in which there is illustrated a preferred embodiment.

BRIEF DESCRIPTION OF DRAWINGS

FIG. 7 shows a perspective view of another embodiment of the disclosure.

FIG. 8 shows a top view of the embodiment in FIG. 7.

FIG. 9 shows a cross sectional view along A-A of FIG. 8 of one embodiment of the disclosure.

FIG. 27 shows a perspective view of one embodiment of the disclosure.

FIG. 28 shows a top view of the embodiment shown in FIG. 27.

FIG. 29 shows a cross sectional view along AA-AA in FIG. 28 of one embodiment of the disclosure.

DETAILED DESCRIPTION OF THE PREFERRED EMBODIMENTS

Figure 1:
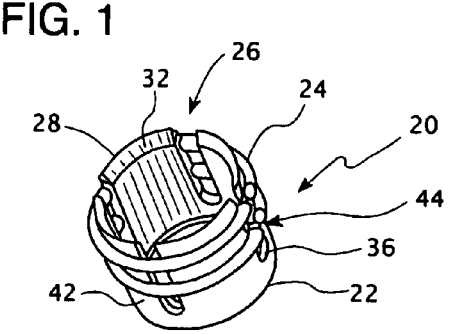
FIG. 1 shows a perspective view of one embodiment of the disclosure.
Figure 3:
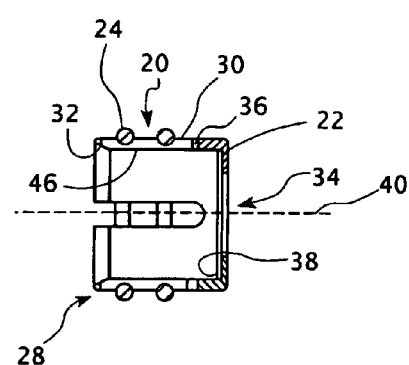
FIG. 3 shows a cross sectional view along A-A in FIG. 2 of one embodiment of the disclosure.
Figure 2:
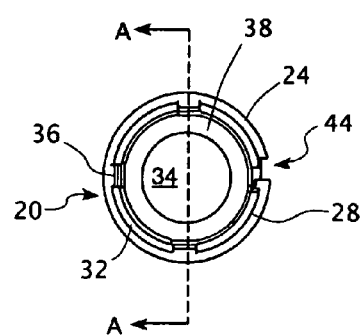
FIG. 2 shows a top view of the embodiment in FIG. 1.

Referring to the drawings in detail wherein like elements are indicated by like numerals, there is shown in FIG. 1 one embodiment of the spring damper 20. The spring damper 20 is generally cylindrically shaped having an open top 28 and a bottom 22 with a hole 34 and is made from a polymer or more specifically a polyamide. The damper 20 also has at least one slot 26 which begins at a slot end 36 near the bottom 22 and runs to the top 28. The embodiment of the damper 20 shown in FIGS. 1, 2 and 3 shows four slots 26 evenly spaced radially and located parallel to a central axis 40. While this embodiment shows four slots 26, it should be understood that more or fewer slots 26 could be used depending on the specific application for the damper 20. It should also be noted that the slots 26 could be angled such as those shown in FIGS. 34, 35, 36.

This embodiment of the damper 20 also shows two grooves 30 around the outer surface 42. The grooves 30 are located a predetermined distance from the bottom 22 and along a common radius from the axis 40. Located in each groove 30 is a ring 24. Each ring 24 has a circular cross section and is housed partially within the groove 30 which has a matching semi circular cross section, best seen in FIG. 3. The ring 24 is made from a spring steel.

It is anticipated that the wall thickness of the damper 20 could be increased such that the groove 30 would be deeper and that each ring 24 would be contained within the groove 30 such that the outer surface 42 would have an approximately smooth profile. The ring 24 could also be molded into the polymer and contained between the outer surface 42 and the inner surface 46 thereby reducing manufacturing costs.

While this embodiment shows two grooves 30 and two corresponding rings 24, it is anticipated that more or fewer grooves 30 and rings 24 could be provided for depending on the specific application of the damper 20.

Another embodiment could use what are commonly called "garter springs", not shown, which are small coiled springs having a major diameter approximately equivalent to the outer diameter of the rings 24. Garter springs are commonly used in seals and would provide an equivalent radial force to bias the damper 20 against the spring S. These garter springs could be used to replace any of the rings shown such as rings 24 or the rings shown in later embodiments and likewise could be molded into the polymer and contained between the outer surface 42 and inner surface 46 of this embodiment and the others disclosed.

While this embodiment shows ring opening 44 in ring 24, FIG. 2, where the openings 44 are located one over another, it is anticipated that these openings 44 could be offset a predetermined angle from one another around axis 40.

Also shown in FIG. 1 is a taper 32 near the top 28 of the damper 20 and a circular hole 34 located in the bottom 22. The hole 34 has a diameter less than the diameter of the outer surface 42 of the damper 20 to provide a spring seat 38 in the bottom 22. To minimize wear to the spring seat 38 under specific extreme loading, a hardened steel seat (not shown) may be inserted or molded into the damper to mate against the spring end 48, best shown FIG. 17. The damper 20 fits partially over the spring S, FIGS. 15, 16, 17.

Figure 17:
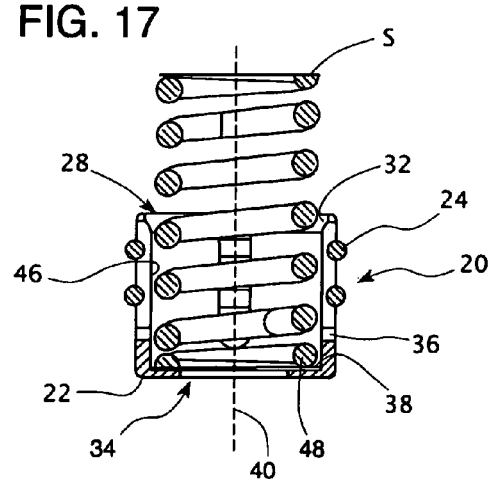
FIG. 17 shows a cross sectional view along AA-AA of FIG. 16 of one embodiment of the disclosure.

Although for example, FIG. 17 shows a gap between the outer diameter of the spring S and the inner diameter of the damper 20 this is exaggerated for drawing clarity. In functioning embodiments, the inner surface 46 is maintained in contact with the outer diameter of the spring S through the compressive force of rings 24.

The rings 24 provide a radial force to bias the damper 20 such that the inner surface 46 makes contact with the outer surface of the valve spring S. When the valve (not shown) is depressed, the spring S is likewise depressed and the outer radial surface of the spring S is biased away from the central axis 40 and deforms the inner surface 46 of the damper 20 to provide for a radial surface contact. The friction between the radial surface of spring S and the depressed radial groove of the inner surface 46 provides a damping effect to the spring S as can be seen from the test data in FIG. 13.

Figure 24:
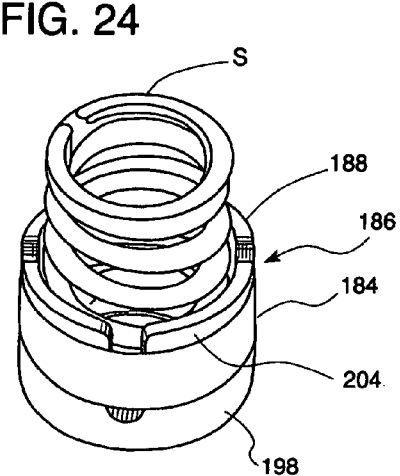
FIG. 24 shows a perspective view of one embodiment of the disclosure.
Figure 26:
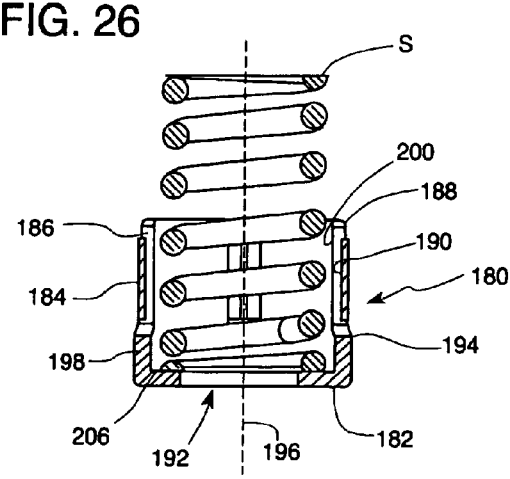
FIG. 26 shows a cross sectional view along AA-AA in FIG. 25 of one embodiment of the disclosure.
Figure 25:
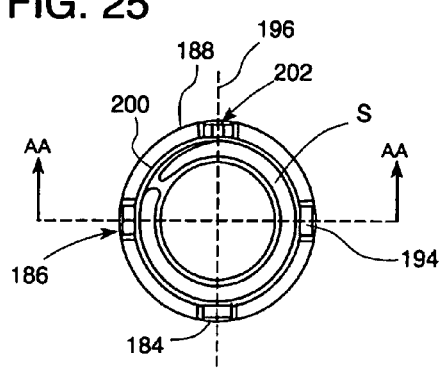
FIG. 25 shows a top view of the embodiment shown in FIG. 24.
Figure 30:
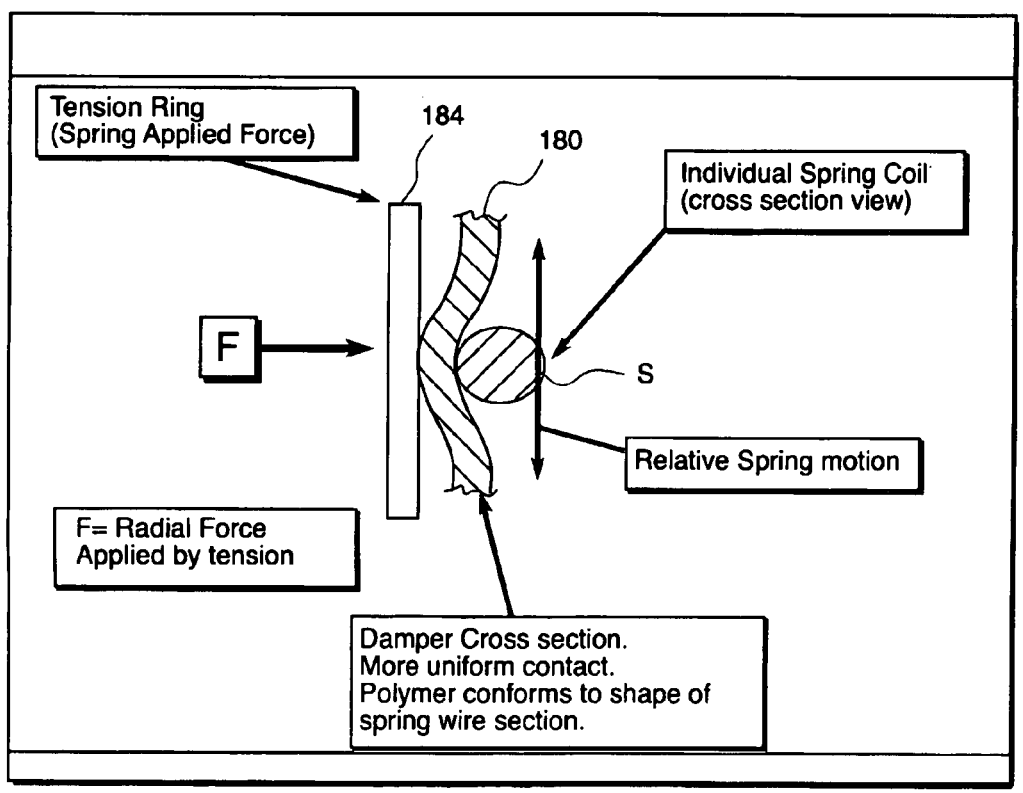
FIG. 30 shows an exaggerated view of the interface of the band, damper and spring of FIGS. 7,8,9.
Figure 31:
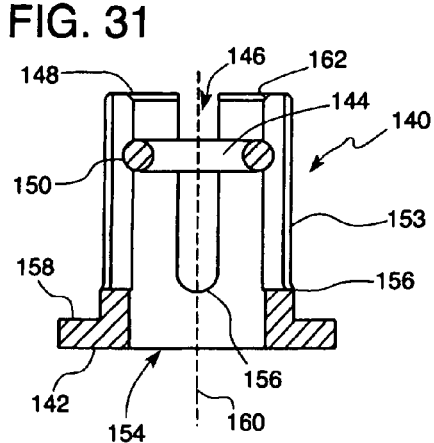
FIG. 31 shows a cross sectional view along B-B of FIG. 32 of the embodiments without spring S shown in FIGS. 10, 11, 12.
Figure 33:
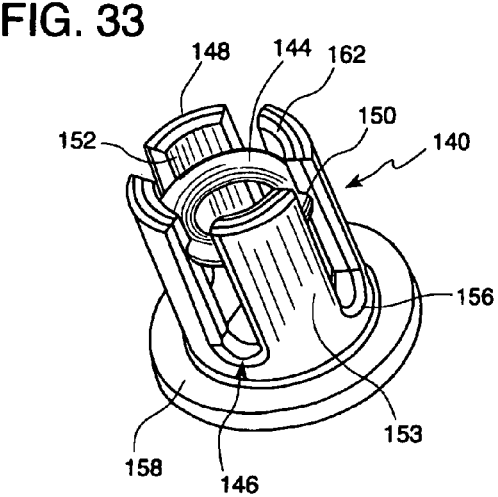
FIG. 33 shows a perspective view of the embodiments of FIGS. 10, 11, 12 without the spring S.
Figure 32:
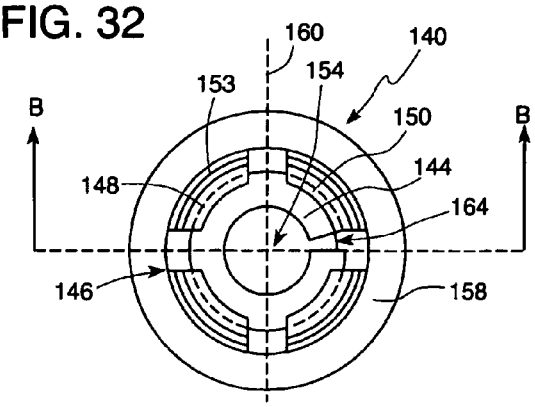
FIG. 32 shows a top view of the embodiments of FIGS. 10, 11, 12 without the spring S.

FIG. 30, not to scale, shows an exaggerated schematic view of the of this interface of the spring S, damper 180 and band 184 of the embodiments shown in FIGS. 24,25,26.

By varying the type, location, number, diameter and cross section of the rings 24 and grooves 30 and by varying the number and shape of slots 26, as well as the types and hardness of the polymers used, various levels of radial force and therefore damping of spring S can be achieved depending upon the design application for the damper 20. Damping of the valve spring S can be increased or decreased over specific rpm levels to lessen valve spring oscillations, the flutter or float of the valve, decrease the noise attributed to the valve and valve springs S and change the thermal loading of the valve spring.

Many of the elements: the rings or bands, grooves, slots, polymer properties can be varied in all of the following embodiments depending upon the specific application for the damper.

In addition, the radial force provided by the rings 24 can compensate for wear or set in the damper 20 or for normal manufacturing tolerances in the spring S and damper 20. Even if the spring S or damper 20 was to wear, the rings 24 would continue to maintain a radial force upon the spring S. Likewise, the embodiments that utilize bands would have the same beneficial effect.

Figure 34:
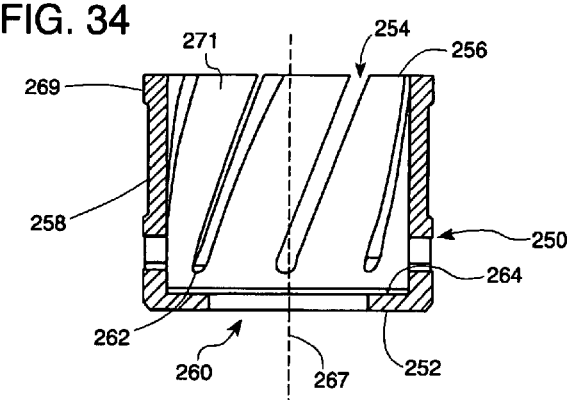
FIG. 34 shows a cross sectional view of another embodiment of a damper along AA-AA of FIG. 35.
Figure 36:
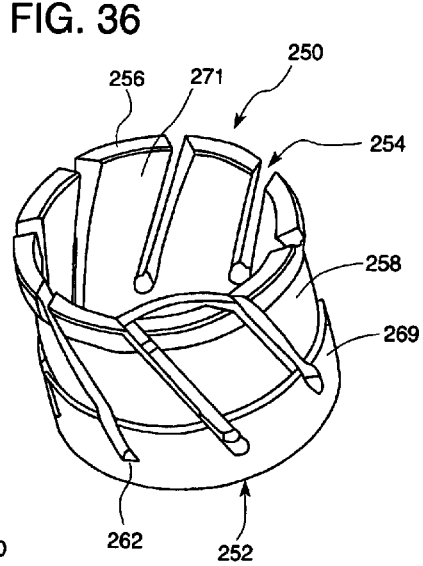
FIG. 36 shows a perspective view of the embodiments shown in FIGS. 34 & 35.
Figure 35:
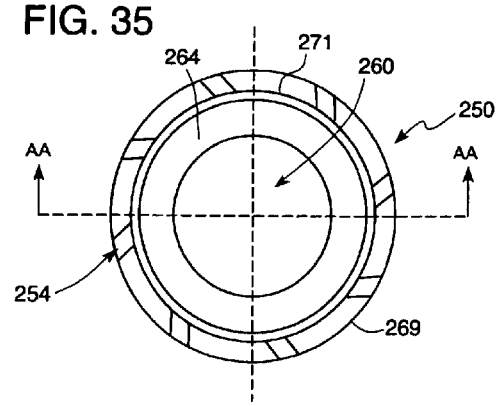
FIG. 35 shows a top view of the embodiment of FIG. 36.

There is shown in FIGS. 4, 5, 6, 18, 19 & 20 another embodiment of the spring damper 60. The spring damper 60 is generally cylindrically shaped having an open top 68 and a bottom 62 with a hole 74. The damper 60 also has at least one slot 66 which begins at a slot end 76 near the bottom 62 and runs to the top 68. The embodiment of the damper 60 shown in FIGS. 4, 5, 6, 18, 19 & 20 shows four slots 66 evenly spaced around a central axis 80. While this embodiment shows four slots 66, it should be understood that more or fewer slots 66 could be used depending on the specific application for the damper 60. In addition, the slots 66 could be angled as shown in FIGS. 34, 35, 36.

This embodiment of the damper 60 also shows two grooves 70 around the outer surface 82. The grooves 70 are located a predetermined distance from the bottom 62 and along a common radius from the axis 80. Located in each groove 70 is a band 64. Each band 64 has a rectangular cross section and is housed partially within the groove 70 which has a matching rectangular cross section, best seen in FIGS. 6, 20. It is anticipated that the wall thickness of the damper 60 could be increased such that the groove 70 would be deeper and the each band 64 would be contained within the groove 70 such that the outer surface 82 would have an approximately smooth profile.

The band 64 could also be molded into the polymer and contained between the outer surface 82 and the inner surface 86.

While this embodiment shows two grooves 70 and two corresponding bands 64, it is anticipated that more or fewer grooves 70 and bands 64 could be provided for depending on the specific application of the damper 60.

Figure 5:
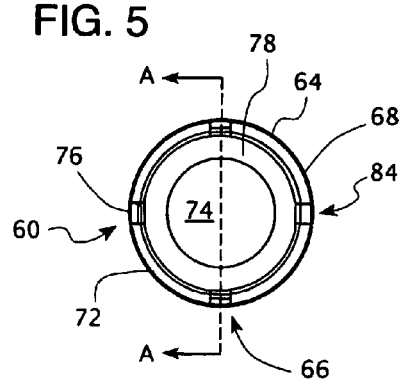
FIG. 5 shows a top view of embodiment in FIG. 4.
Figure 10:
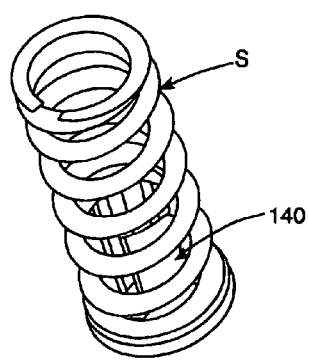
FIG. 10 shows a perspective view of another embodiment of the disclosure.
Figure 12:
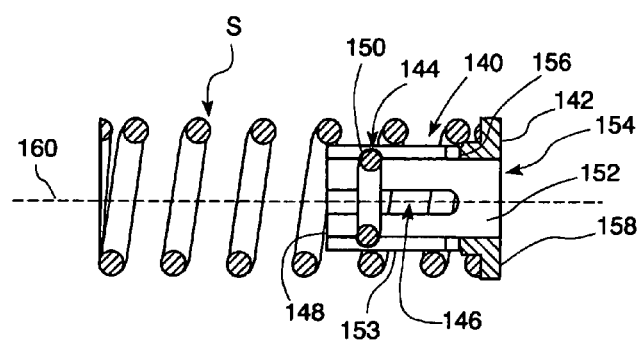
FIG. 12 shows a cross sectional view along AA-AA of FIG. 11 of one embodiment of the disclosure.
Figure 11:
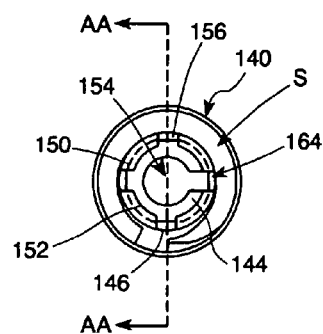
FIG. 11 shows a top view of the embodiment in FIG. 10.
Figure 19:
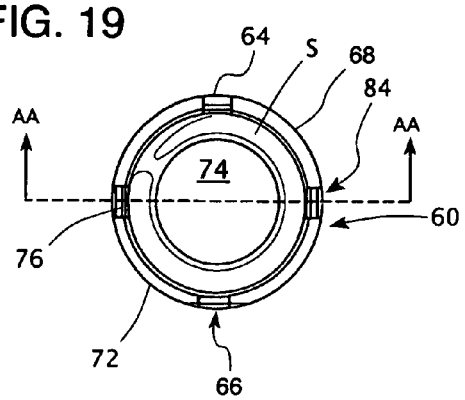
FIG. 19 shows a top view of the embodiment of FIG. 18.

While this embodiment shows ring opening 84 in band 64, FIGS. 5, 19 where the openings 84 are located one over another, it is anticipated that these openings 84 could be offset a predetermined angle from one another around axis 80.

Figure 4:
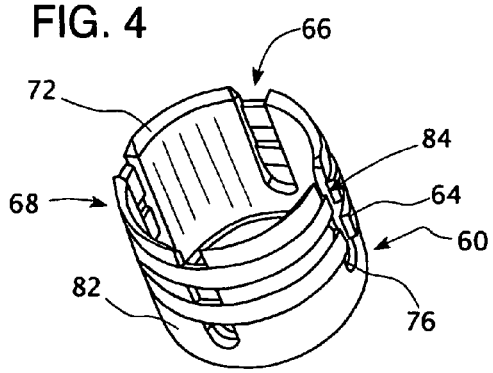
FIG. 4 shows a perspective view of another embodiment of the disclosure.

Also shown in FIG. 4 is a taper 72 near the top 68 of the damper 60 and a circular hole 74 located in the bottom 62. The hole 74 has a diameter less than the diameter of the outer surface 82 of the damper 60 to provide a rest or spring land 78 in the bottom 62. The damper 60 fits partially over the spring S, FIGS. 18, 19, 20.

The bands 64 bias the damper 60 such that the inner surface 86 makes contact with the outer surface of the valve spring S. When the valve (not shown) is depressed, the spring S is likewise depressed and the outer surface of the spring S is in radial contact with the inner surface 86 of the damper 60. The friction between the spring S and the inner surface 86 provides a damping effect to the spring S.

By varying the type, location, number, diameter and cross section of the bands 64 and grooves 70 and by varying the number of slots 66, the type and hardness of the polymer used and various levels of radial force, the damping of spring S can be achieved. Damping of the valve spring S can be increased or decreased over specific rpm levels to lessen the flutter or float and decrease the noise attributed to the valve and valve springs.

Another embodiment of the damper 100 is shown in FIG. 7, 8, 9, 21,22 & 23. The damper fits partially over spring S, FIGS. 21, 22, 23. In this embodiment, the damper 100 has a plurality of upper tabs 128 located near the top 108 of the damper 100. While this embodiment shows eight upper tabs 128 located near the top 108 and at a predetermined angular location it should be understood that more or fewer upper tabs 128 could be located on the outer surface 122 and the angular location could be varied depending on the specific application for the damper 100. The angular location of the upper tabs 128 and lower tabs 126 can be offset to make the manufacturing of damper 100 easier.

Near the bottom 102 are located a plurality of lower tabs 126. While this embodiment shows four lower tabs 126 located near the bottom 102 and at a predetermined angular location it should be understood that more or fewer lower tabs 126 could be located on the outer surface 122 and the angular location could be varied depending on the specific application for the damper 100.

The provision of lower tab 126 and upper tab 128 is in place of a fully profiled groove, such as groove 30 shown in FIGS. 1,2,3 which reduces material costs and increases manufacturability of the damper.

The area between the upper tabs 128 and the lower tabs 126 forms a groove 110. The groove 110 houses and retains the band 130, FIGS. 21,22,23. This embodiment of the damper 100 shows four slots 106 running from a slot end 116 located near the bottom 102 to the top 108. While this embodiment of the damper 100 shows four slots 106 it is to be understood that more or fewer slots 106 could be provided depending on the specific application for the damper 100.

This embodiment of the damper 100 also shows a hub 104 extending from the spring land 118 towards the top 108 along the axis 120. This hub 104 has a stem seal 124 for sealing the valve stem (not shown). The valve stem (not shown) would extend through the damper 100 hole 114 from the top 108 through the bottom 102.

The stem seal 124 is known in the art and is many times used as an add on component to seal the stem of the valve from the combustion chamber, not shown. This stem seal 124 can be incorporated into the damper 100, FIG. 9, or could be a separate component that would fit into an opening provided in the bottom 102 of the damper 100, not shown. A separate stem seal could be pre-assembled into the damper 100, not shown, thereby reducing the cost of components and complexity of the cylinder head assembly process. The stem seal 124 could be an interference fit into a hole similar to hole 114.

The embodiment of the damper 100 shown in FIGS. 7, 8, 9, 21, 22, 23 shows a relatively wide groove 110 and it is anticipated that either one wide rectangular band 130 would be placed in groove 110 and retained by the upper tab 128 and the lower tab 126. Alternatively, two smaller rectangular cross sectional bands (not shown) could be placed around the damper 100 and retained by the upper tab(s) 128 and the lower tab(s) 126 in the groove 110.

FIGS. 10, 11, 12, 31, 32 and 33 show an alternative embodiment of the damper 140. This embodiment the damper 140 is installed interior to spring S. This embodiment of the damper 140 could be used in applications where space is critical or the other related engine components could not be modified to incorporate the other embodiments of the damper that resides on the exterior of the spring S.

The damper 140 has a hole 154 running from a bottom 142 to the top 148 along axis 160. There is a spring land 158 near the bottom 142 which extends exterior to the major diameter of spring S.

A plurality of slots 146 extend from a slot end 156 near the bottom 142 to the top 148. While this embodiment of the damper 140 shows four slots 146, it should be understood that more or fewer slots 146 could be included depending on the specific application for the damper 140. The damper 140 has an inner surface 152 and located therein is a groove 150 which is located between the bottom 142 and the top 148 around axis 160. The groove 150 is approximately semi-circular in cross section and sized to fit the ring 144 which has a corresponding circular profile. The ring 144 is retained in the groove 150 and provides a radial force to bias the outer surface 153 of the damper 140 against the inner diameter of the spring S.

As discussed previously, the spring S causes a deformation to the outer surface 153 and makes a radial contact with the outer surface 153. This radial contact, see FIG. 30, spreads the wear of both the damper 140 and spring S over a larger radial surface area and greatly enhances the damping characteristics as compared to the background art using a steel damper and point contact.

While this embodiment of the damper 140 shows one groove 150 and corresponding ring 144, it should be understood that more or fewer grooves 150 and rings 144 could be used depending upon the specific application of the damper 140.

This embodiment of the damper 140 could also have slots 146 such as those shown in FIGS. 34, 35, 36.

Figure 13:
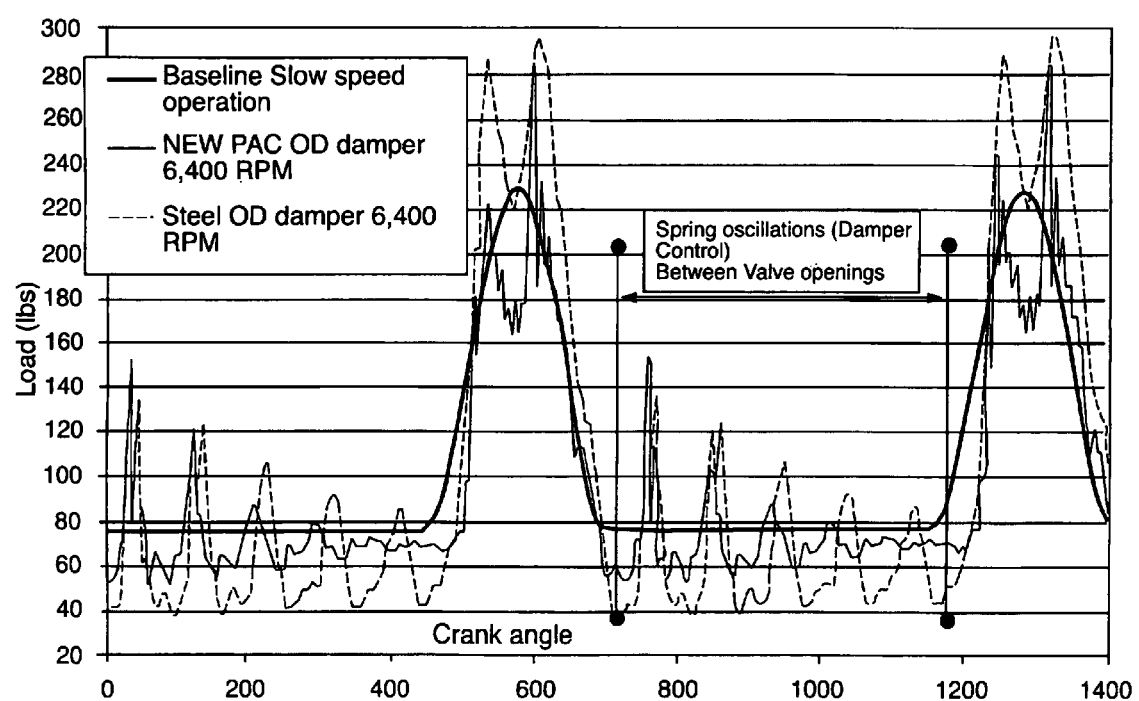
FIG. 13 shows test data for one embodiment of this disclosure as compared to background art made from steel.

FIG. 13 shows a comparison graph of the response or oscillations of spring S having a steel damper with point contact with the spring, as compared to a plastic damper having radial contact with the full length of the wire of the spring.

Figure 14:
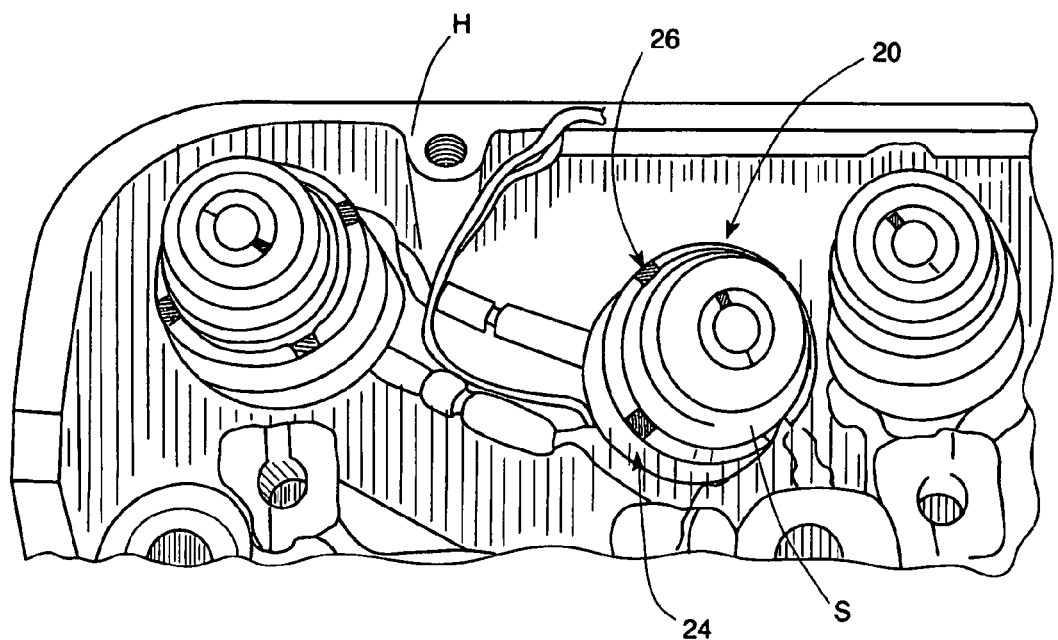
FIG. 14 shows a one embodiment installed on a test fixture.

FIG. 14 shows one embodiment of a damper 20 installed over a spring S and installed in a head H.

Figure 15:
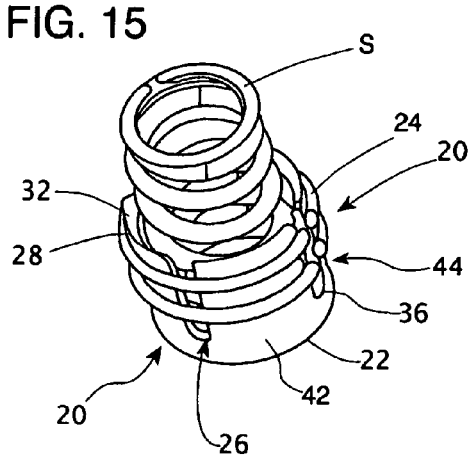
FIG. 15 shows a perspective view of one embodiment of the disclosure.
Figure 16:
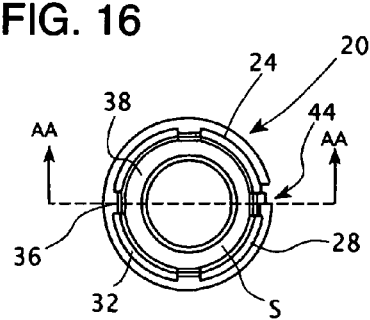
FIG. 16 shows a top view of the embodiment in FIG. 15.

FIGS. 15, 16, 17 show the same damper 20 as that shown in FIGS. 1, 2, 3 with the addition of the spring S.

Figure 6:
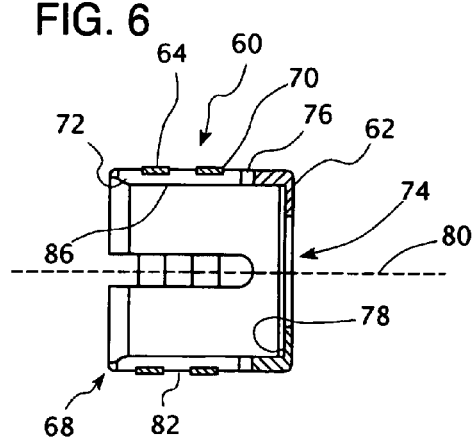
FIG. 6 shows a cross sectional view along A-A of FIG. 5 of one embodiment of the disclosure.
Figure 18:
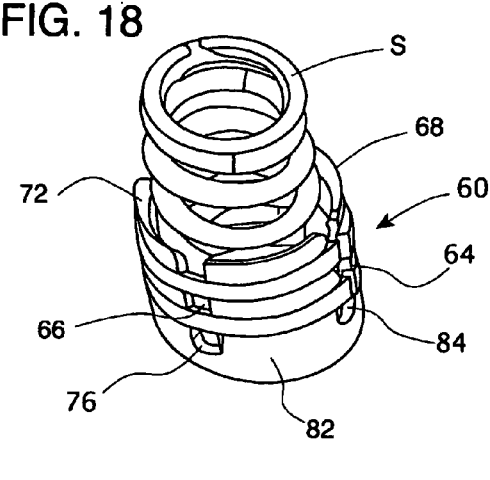
FIG. 18 shows a perspective view of one embodiment of the disclosure.
Figure 20:
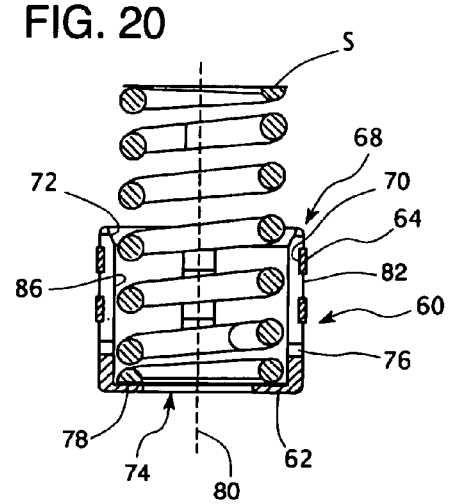
FIG. 20 shows a cross sectional view along AA-AA of FIG. 19 of one embodiment of the disclosure.

FIGS. 18, 19, 20 show the same damper 60 as shown in FIGS. 4, 5, 6 with the addition of spring S.

Figure 21:
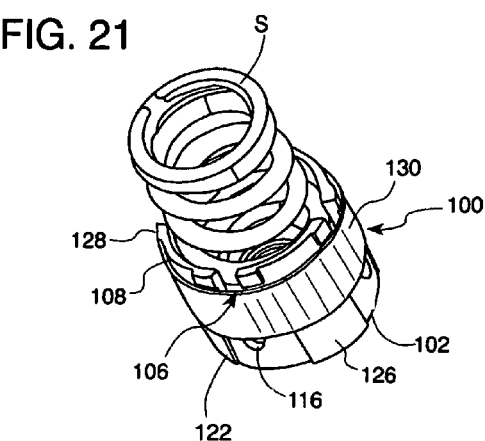
FIG. 21 shows a perspective view of one embodiment of the disclosure.
Figure 23:
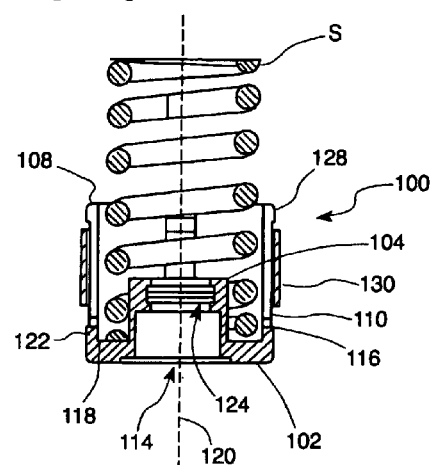
FIG. 23 shows a cross sectional view along AA-AA of FIG. 22 of one embodiment of the disclosure.
Figure 22:
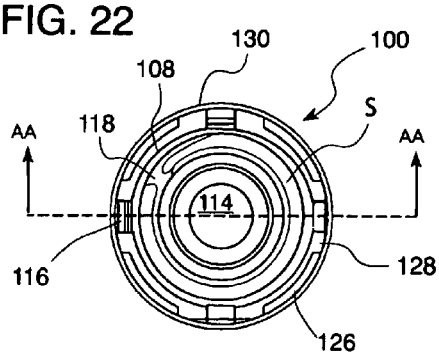
FIG. 22 shows a top view of the embodiment of FIG. 21.

FIGS. 21, 22, 23 show the same damper 100 as that shown in FIGS. 7, 8, 9 with the addition of a band 130 and spring S.

FIGS. 24, 25, 26 show an alternative embodiment of the damper 180 installed on spring S. The spring damper 180 is generally cylindrically shaped having an open top 188 and a bottom 182 with a hole 192. The damper 180 also has at least one slot 186 which begins at a slot end 194 near the bottom 182 and runs to the top 188. The embodiment of the damper 180 shown in FIGS. 24, 25, 26 shows four slots 186 evenly spaced around a central axis 196. While this embodiment shows four slots 186, it should be understood that more or fewer slots 186 could be used depending on the specific application for the damper 180.

This embodiment of the damper 180 also shows one groove 190 around the outer surface 198. The groove 190 is located a predetermined distance from the bottom 182 and along a radius from the axis 196. Located in each groove 190 is a band 184. The band 184 has a rectangular cross section and is housed partially within the groove 190 and retained by an upper tab 204 and the groove 190 cut into the outer surface 198.

It is anticipated that the wall thickness of the damper 180 could be increased such that the groove 190 would be deeper and the band 184 would be contained within the groove 190 such that the outer surface 198 would have an approximately smooth profile. Alternatively, the band 184 could be molded into the polymer between the outer surface 198 and inner surface 200.

While this embodiment shows band opening 202 in band 184, FIG. 25 where the band opening 202 is located over the slot 186, it is anticipated that this opening 202 could be offset a predetermined angle around axis 80 and would not necessarily need to be located over slot 186.

Also shown in FIG. 25 is a circular hole 192 located in the bottom 182. The hole 192 has a diameter less than the diameter of the outer surface 198 of the damper 180 to provide a rest or spring land 206 in the bottom 182. The damper 180 fits partially over the spring S.

The band 190 provides a radial force to bias the damper 180 such that the inner surface 200 makes radial contact with the outer surface of the valve spring S. When the valve (not shown) is depressed, the spring S is likewise depressed and the outer surface of the spring is in radial contact with the inner surface 200 of the damper 180. The friction between the spring S and the inner surface 200 provides a damping effect to the spring S.

By varying the type, location, number, diameter and cross section of the band 184 and groove 190 and by varying the number and shape of slots 194, as well as the type and hardness of the polymer used, various levels of radial force and therefore damping of spring S can be achieved depending upon the design application for damper 180. Damping of the valve spring S can be increased or decreased over specific rpm levels to lessen the flutter or float of the valve and decrease the noise attributed to the valve and valve springs.

The spring damper 210 of FIGS. 27, 28, 29 is generally cylindrically shaped having an open top 218 and a bottom 212 with a hole 222. The damper 210 also has at least one slot 216 which begins at a slot end 224 near the bottom 212 and runs to the top 218. The embodiment of the damper 210 shown in FIGS. 27,28,29 shows four slots 216 evenly spaced around a central axis 226. While this embodiment shows four slots 216, it should be understood that more or fewer slots 216 could be used depending on the specific application for the damper 210.

This embodiment of the damper 210 also shows a groove 220 around the outer surface 228. The groove 220 is located a predetermined distance from the bottom 212 and along a radius from the axis 226. Located in the groove 220 is a band 214. Each band 214 has a rectangular cross section and is housed partially within the groove 220. It is anticipated that the wall thickness of the damper 210 could be increased such that the groove 220 would be deeper and the band 214 could be contained within the groove 220 such that the outer surface 228 would have an approximately smooth profile. Alternatively, the band 214 could be molded into the polymer between the inner surface 230 and outer surface 228.

While this embodiment shows one groove 220 and one corresponding band 214, it is anticipated that more or fewer grooves 220 and bands 214 could be provided for depending on the specific application of the damper 210.

This embodiment shows ring opening 232 in band 214, FIG. 28, where the band opening 232 is located one over a slot 216, it is anticipated that this band opening 232 could be offset a predetermined angle another around axis 226.

Also shown in FIG. 27 there are a plurality of upper tabs 234 near the top 218. The upper tabs 234 are for retaining the band 214 on the damper 210. Located near the bottom 212 are located a plurality of lower tabs 236 for retaining the band 214 on the damper 210. The damper 210 fits partially over the spring S, as seen in FIGS. 27, 28, 29.

The band 214 provides a radial force to bias the damper 210 such that the inner surface 230 is in radial contact with the outer surface of the valve spring S. When the valve (not shown) is depressed, the spring S is likewise depressed and the outer surface of the spring makes radial contact with the inner surface 230 of the damper 210. The friction between the spring S and the inner surface 230 provides a damping effect to the spring S.

By varying the type, location, number, diameter and cross section of the band 214 and grooves 220 and by varying the number and type of slots 216, as well as the type and hardness of the polymer used, various levels of radial force and therefore damping of spring S can be achieved depending upon the design application for the damper 20. Damping of the valve spring S can be increased or decreased over specific rpm levels to lessen the valve spring oscillations, the flutter or float of the valve and decrease the noise attributed to the valve and valve springs.

FIG. 34 shows a cross sectional view of another embodiment of the damper 250. Damper 250 is generally cylindrically shaped having an open top 256 and a bottom 252 with a hole 260 and is made from a polymer. The damper 250 also has at least one slot 254 which begins at a slot end 262 near the bottom 252 and runs to the top 256. This embodiment of the damper 250 shown in FIGS. 34, 35 and 36 shows eight slots 254 evenly spaced radially and located at an angle relative to axis 267. While this embodiment shows eight slots 254, it should be understood that more or fewer slots 254 could be used depending on the specific application for the damper 250.

This embodiment of the damper 250 also shows one groove 258 around the outer surface 269. The groove 258 is located a predetermined distance from the bottom 252 and along a common radius from the axis 267. Located in groove 258 would be a band, not shown, similar to the band shown in FIGS. 28, 29, 30.

It is anticipated that the wall thickness of the damper 250 could be increased such that the groove 258 would be deeper and the band would be contained within the groove 258 such that the outer surface 269 would have an approximately smooth profile. The band could also be molded into the polymer and contained between the outer surface 269 and the inner surface 271.

While this embodiment discusses one band and one groove 258, it is anticipated that more or fewer grooves 258 and bands could be provided for depending on the specific application of the damper 250.

Also shown in FIG. 34 is a circular hole 260 located in the bottom 252. The hole 260 has a diameter less than the diameter of the outer surface 269 of the damper 250 to provide a rest or spring land 264 in the bottom 252. The damper 260 fits partially over the spring S, not shown.

FIGS. 37-50 show various embodiments of band 290. Band 290 can have various shaped openings and elements in the wall to provide alternative damping characteristics.

Figure 37:
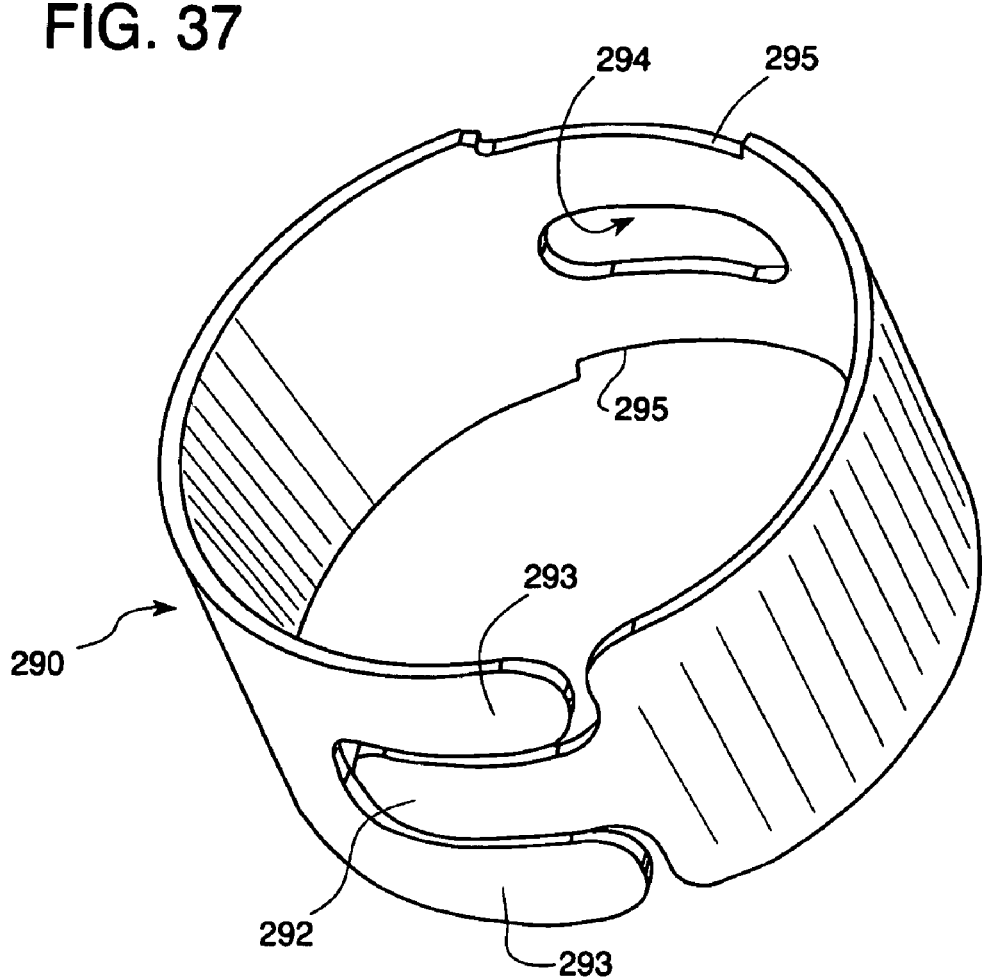
FIG. 37 shows a perspective view of one embodiment of a band having a finger and lands on one side and oblong hole and cutouts on an opposite side.

FIG. 37 shows one embodiment of a band 290. It is beneficial to have an opening in the band 290 to aid the installation of the band 290 on a damper. In this embodiment there is a finger 292 and lands 293 forming the opening. This arrangement tends to reduce the loading of the damper in the location of the opening in the band 290. In other words, the loading at the position of the opening in the band 290 is reduced in this area of the damper by providing various types of openings, in this embodiment the finger 292 and lands 293.

Likewise, this embodiment of the band 290 discloses a hole 294 and pair of cutouts 295, one cutout 295 above the hole 294 and a second cutout 295 below hole 294. This tends to stiffen the band 290 to discourage the band 290 from opening and closing at the finger 292 and lands 293 as the spring cycles.

Figure 38:
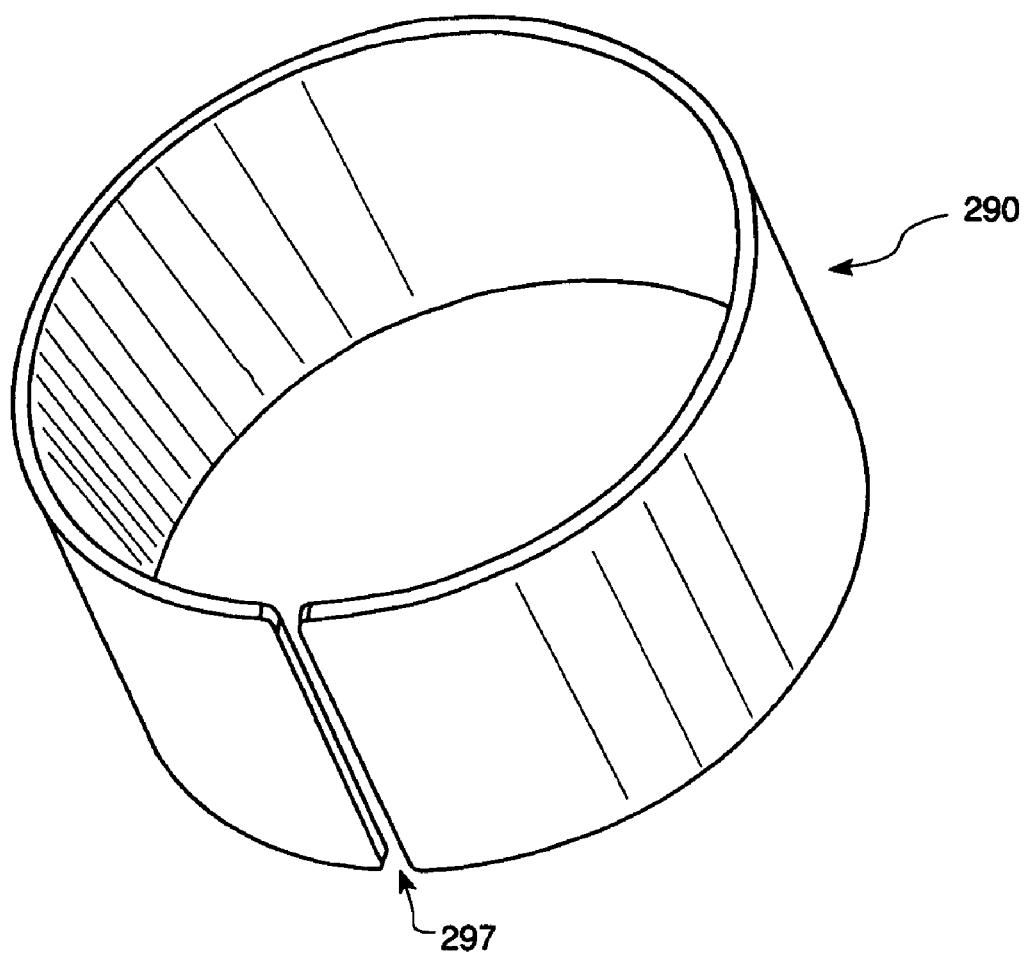
FIG. 38 shows a perspective view of one embodiment of a band having a vertical cut.

FIG. 38 shows another embodiment of the band 290 having an opening vertical cut 297.

Figure 39:
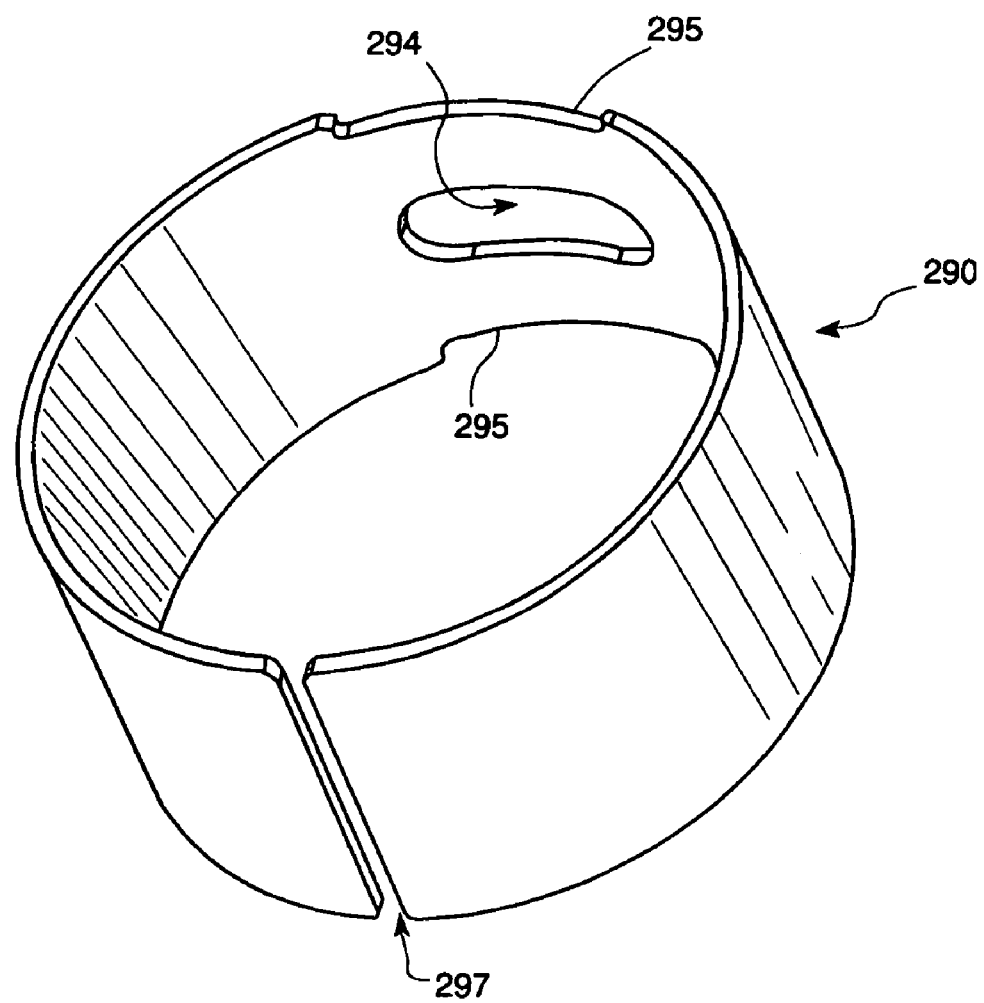
FIG. 39 shows a perspective view of one embodiment of the a band having an oblong hole, cut outs and a vertical cut.

FIG. 39 shows another embodiment of the band 290 having an opening vertical cut 297 and a hole 294 with one cutout 295 above hole 294 and one cutout 295 below hole 294 opposite from the vertical cut 297.

Figure 40:
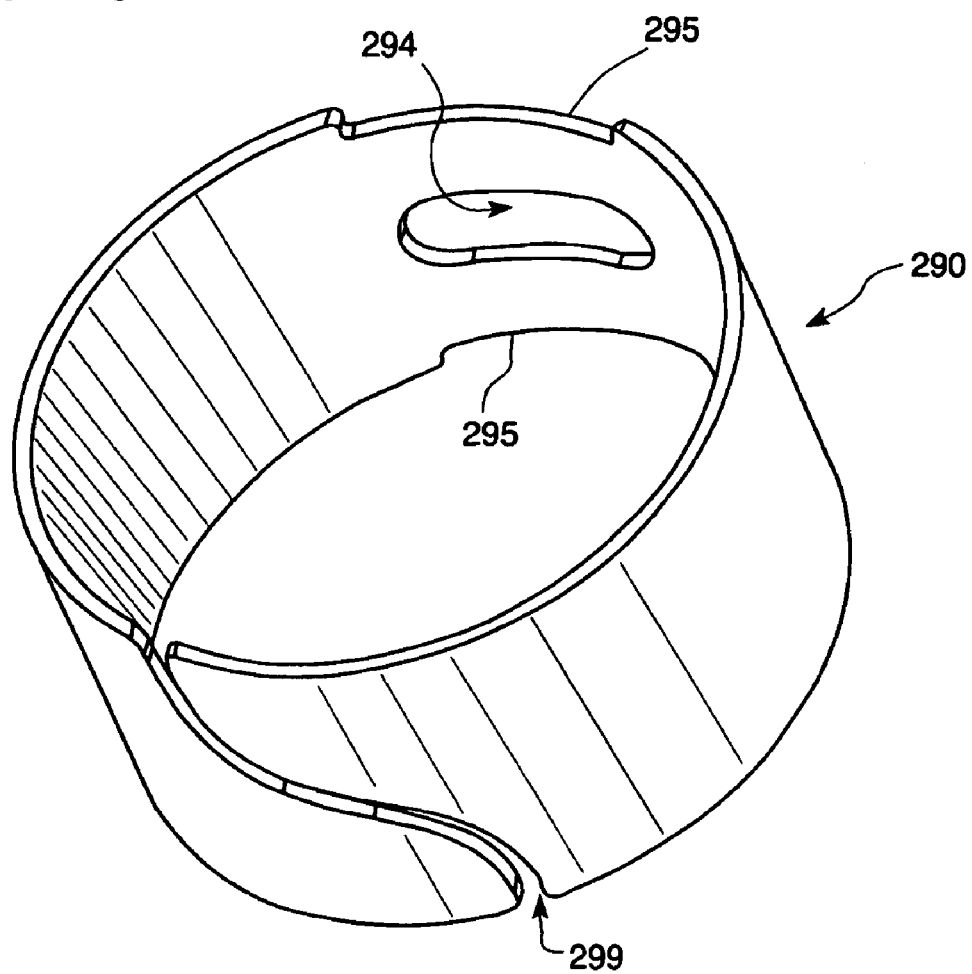
FIG. 40 shows a perspective view of one embodiment of a band having an oblong hole, cut outs and s shaped cut or s-cut.

FIG. 40 shows another embodiment of the band 290 having an opening s-cut 299 and a hole 294 with one cutout 295 above hole 294 and one cutout 295 below hole 294 opposite from the s-cut 299.

Figure 41:
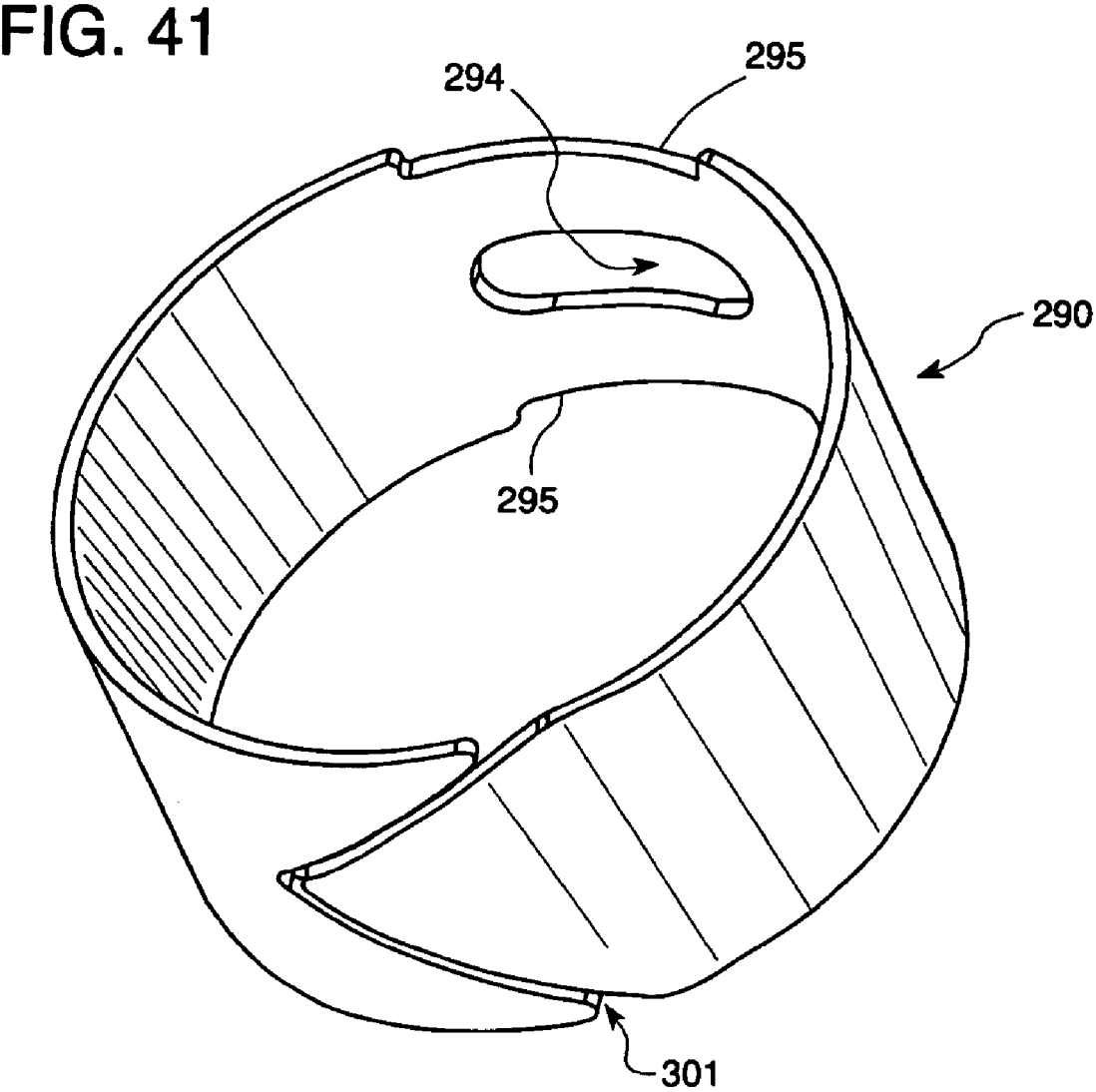
FIG. 41 shows a perspective view of one embodiment of a band having an oblong hole, cut outs and v shaped cut or v-cut.

FIG. 41. shows another embodiment of the band 290 having an opening v-cut 301 and a hole 294 with one cutout 295 above hole 294 and one cutout 295 below hole 294 opposite from the v-cut 301.

Figure 42:
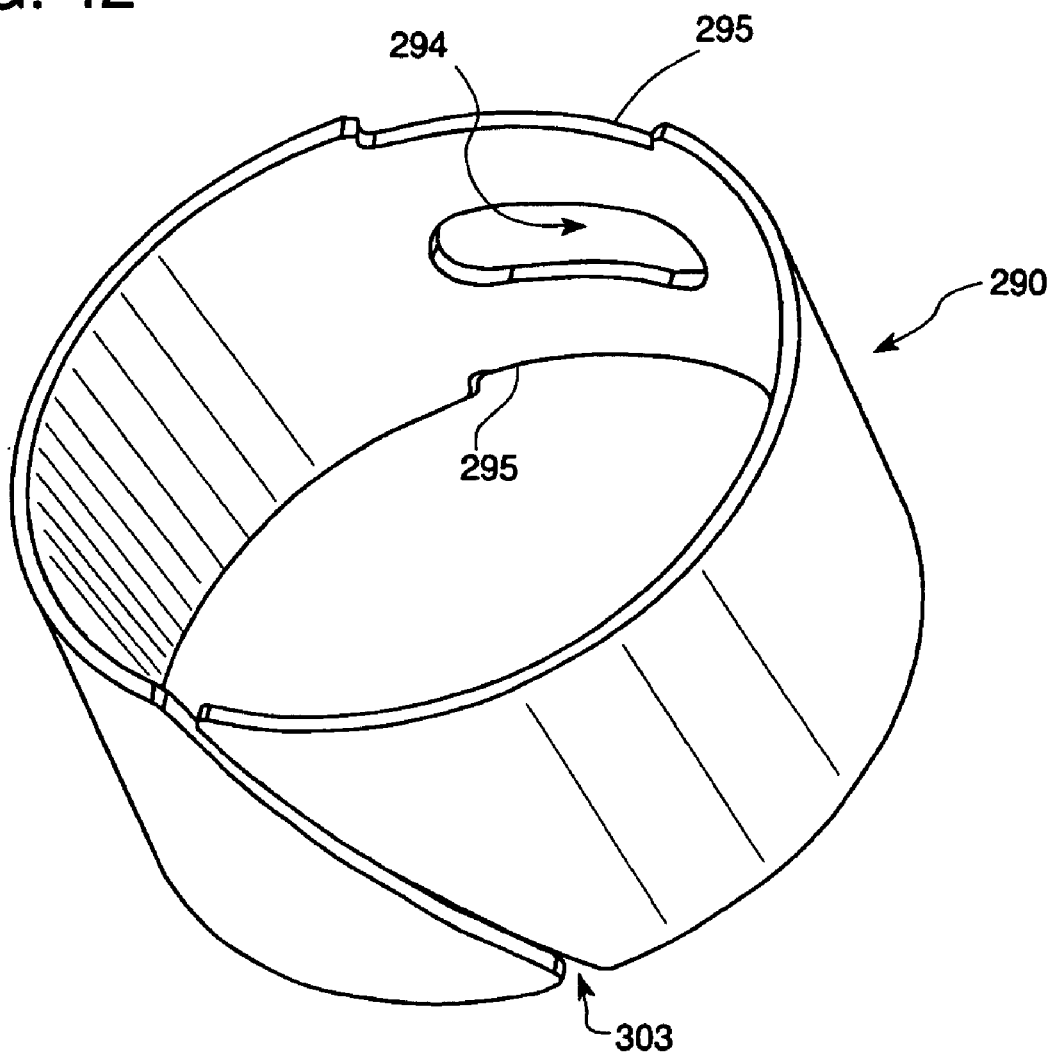
FIG. 42 shows a perspective view of one embodiment of a band having an oblong hole, cut outs and an angled cut or z-cut.

FIG. 42 shows another embodiment of the band 290 having an opening z-cut 303 and a hole 294 with one cutout 295 above hole 294 and one cutout 295 below hole 294 opposite from the z-cut 303.

FIGS. 43-50 show various embodiments of the band 290. While these figures show generically an opening with finger 292 and lands 293 it is to be understood that these enhancements shown in FIGS. 43-50 could be applied to bands 290 having opening vertical cut 297, s-cut 299, v-cut 301 and z-cut 303 and either with or without hole 294 and cutouts 295.

Figure 43:
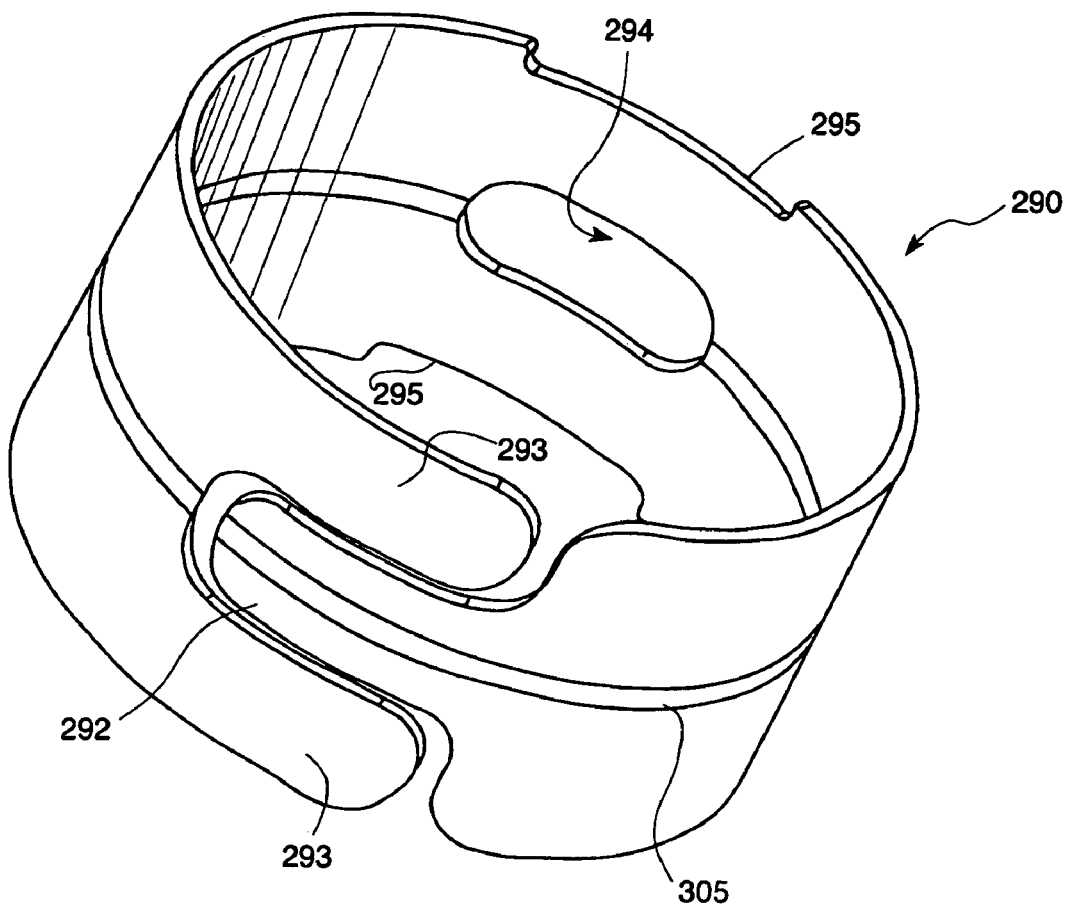
FIG. 43 shows a perspective view of one embodiment of a band having an oblong hole, cut outs, finger and lands and radial rib.

FIG. 43 shows a band 290 having finger 292 and lands 293 with hole 294 and cutouts 295 with a single radial rib 305, where the rib 305 is convex on the inside diameter of band 290 and concave on the outside diameter of band 290.

Figure 44:
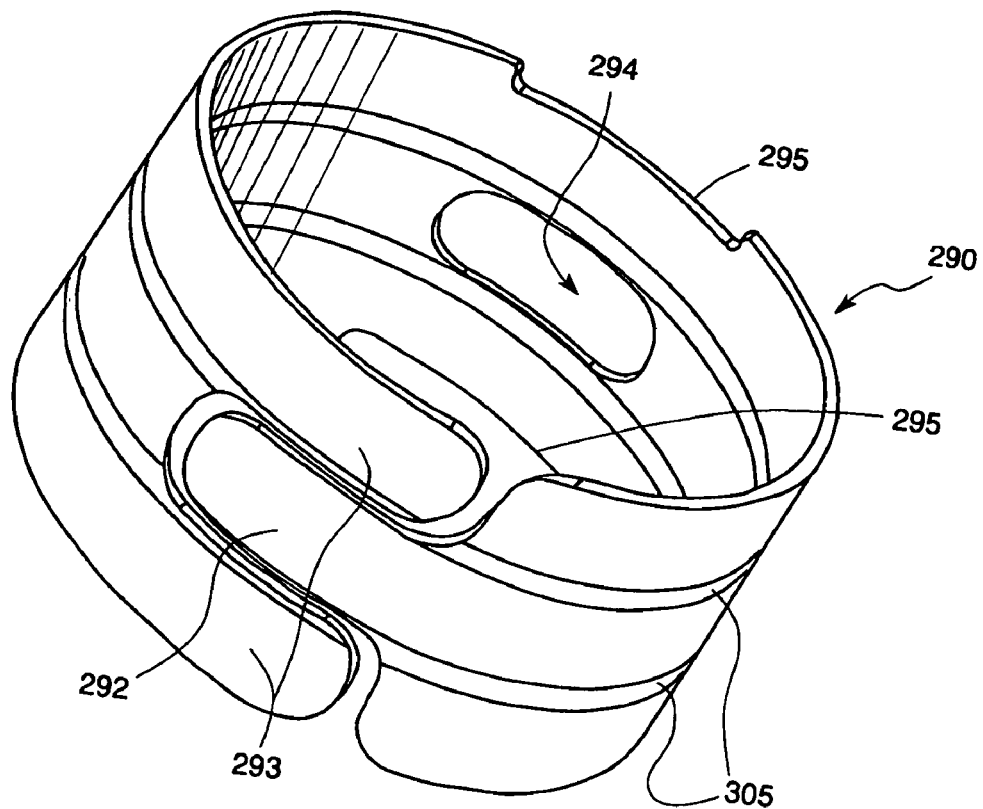
FIG. 44 shows a perspective view of one embodiment of a band having an oblong hole, cut outs, finger and lands and two radial ribs.

FIG. 44 shows a band 290 having finger 292 and lands 293 with hole 294 and cutouts 295 with a two radial ribs 305, where the ribs 305 are convex on the inside diameter of band 290 and concave on the outside diameter of band 290.

Figure 45:
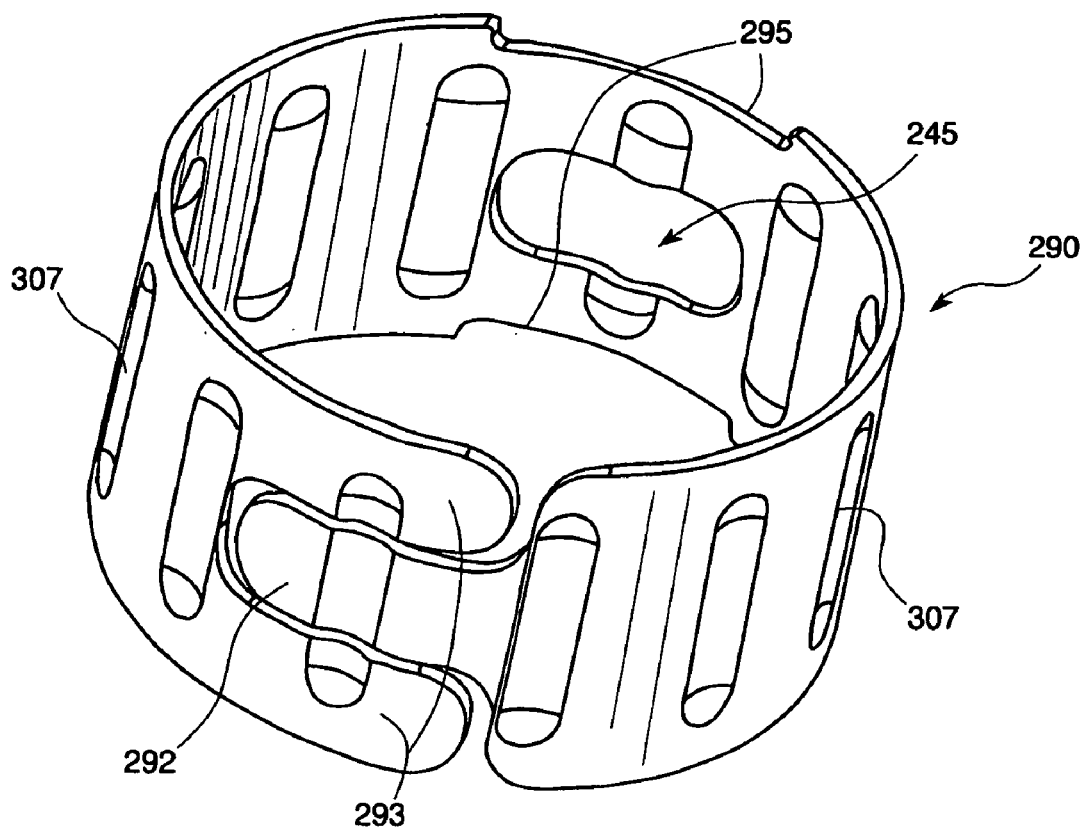
FIG. 45 shows a perspective view of one embodiment of a band having an oblong hole, cut outs, finger and lands and vertical recesses.

FIG. 45 shows a band 290 having finger 292 and lands 293 with hole 294 and cutouts 295 with a plurality of vertical recesses 307. The vertical recesses 307 are evenly spaced around the circumference of the band 290. The vertical recesses 307 are convex on the inside diameter and concave on the outside diameter of the band 290.

While FIG. 45 shows a specific number of vertical recesses 307 evenly spaced, it should be understood that more or fewer recesses 307 could be incorporated into the band 290 and the spacing would not necessarily need to be even nor the same distance between the top and bottom of the band 290. The spacing and number of the recesses 307 would depend on the particular application of the damper on which the band 290 is used.

Figure 46:
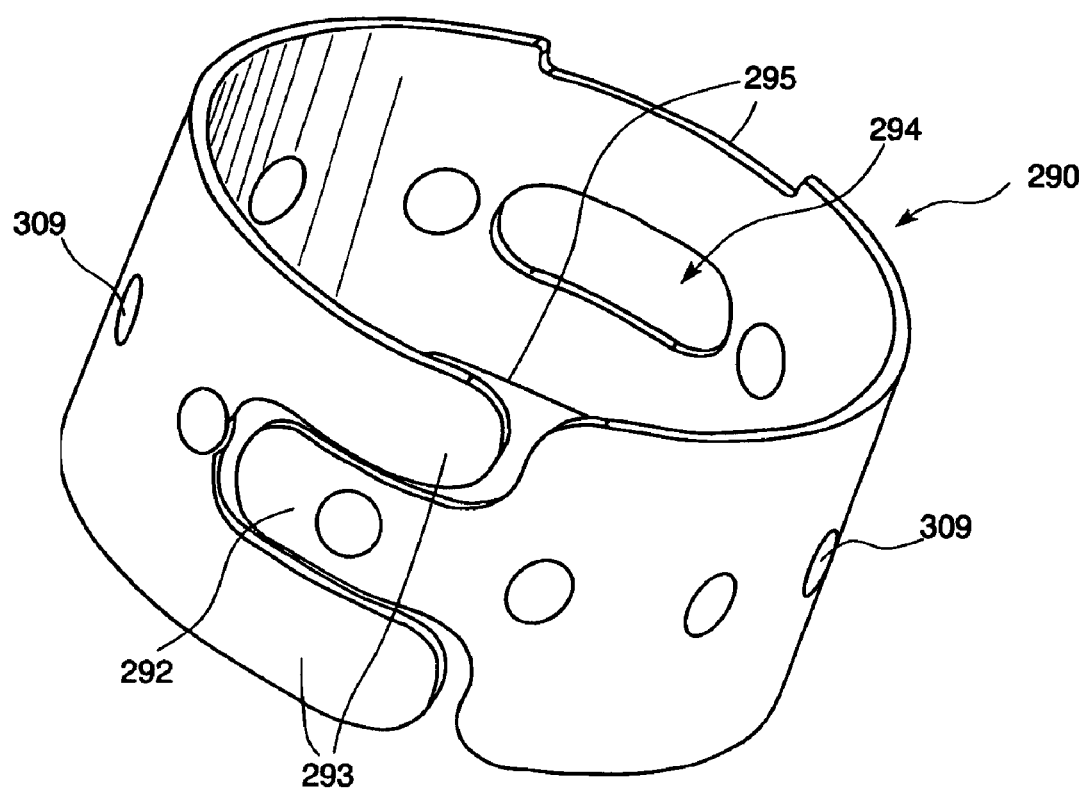
FIG. 46 shows a perspective view of one embodiment of a band having an oblong hole, cut outs, finger and lands and circular recesses.

FIG. 46 shows a band 290 having finger 292 and lands 293 with hole 294 and cutouts 295 with a single row of circular recesses 309 around the circumference of the band 290. The circular recesses 309 are evenly spaced around the circumference of the band 290. The circular recesses 309 are convex on the inside diameter and concave on the outside diameter of the band 290.

Figure 47:
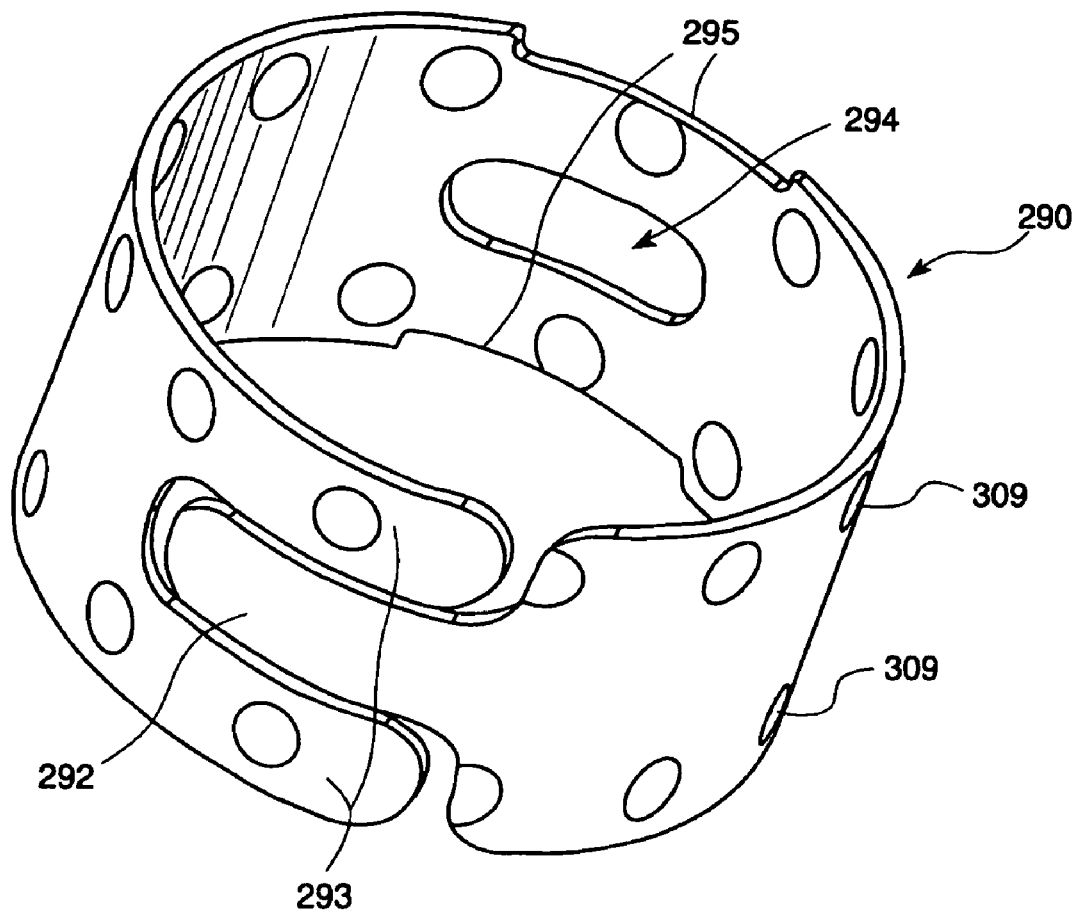
FIG. 47 shows a perspective view of one embodiment of a band having an oblong hole, cut outs, finger and lands and two rows of circular recesses.

FIG. 47 shows a band 290 having finger 292 and lands 293 with hole 294 and cutouts 295 with two rows of circular recesses 309 around the circumference of the band 290. The circular recesses 309 are in rows and evenly spaced around the circumference of the band 290. The circular recesses 309 are convex on the inside diameter and concave on the outside diameter of the band 290.

While FIGS. 46, 47 show a specific number of circular recesses 309 evenly spaced, it should be understood that more or fewer recesses 309 could be incorporated into the band 290 and the spacing would not necessarily need to be even nor the same distance between the top and bottom of the band 290. The spacing and number of the recesses 309 would depend on the particular application of the damper on which the band 290 is used.

Figure 48:
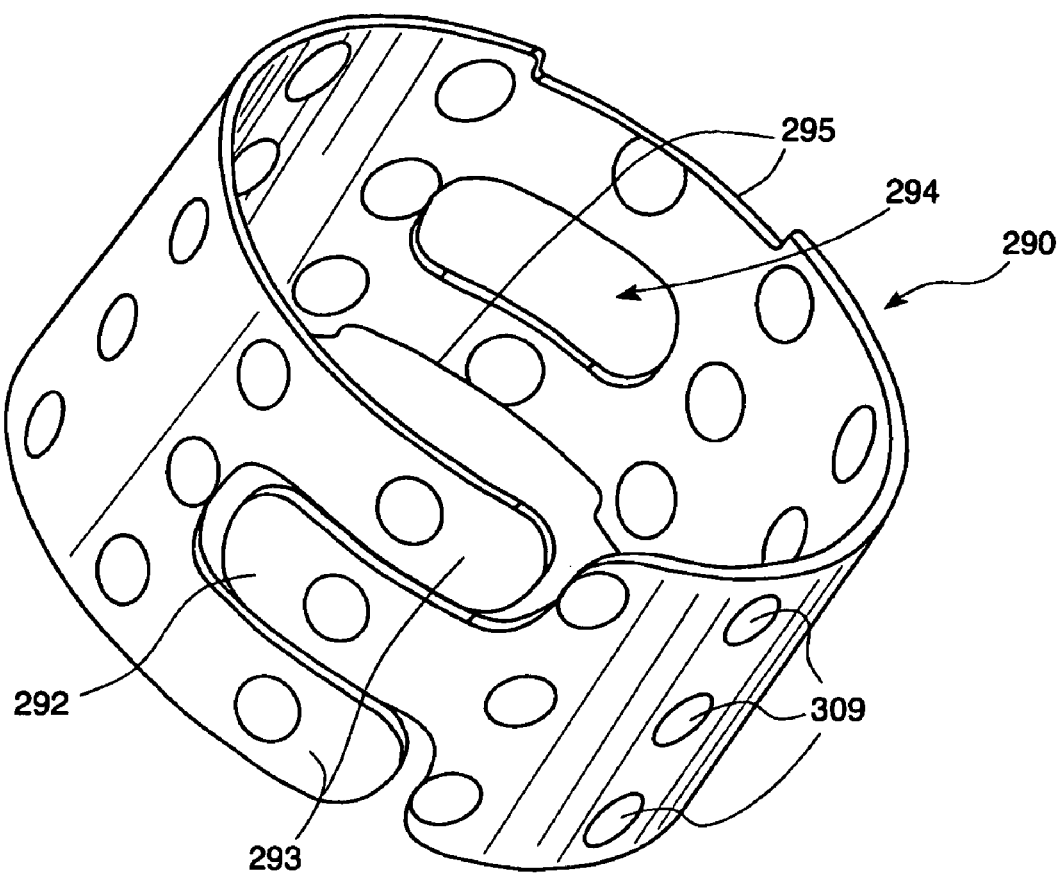
FIG. 48 shows a perspective view of one embodiment of the a band having an oblong hole, cut outs, finger and lands and three rows of circular recesses

FIG. 48 shows a band 290 having finger 292 and lands 293 with hole 294 and cutouts 295 with three rows of circular recesses 309 around the circumference of the band 290. The circular recesses 309 are in rows and evenly spaced around the circumference of the band 290. The circular recesses 309 are convex on the inside diameter and concave on the outside diameter of the band 290.

Even though the circular recesses 309 are shown evenly spaced around the circumference of band 290 and along a common circumferential location between the top and bottom of the band 290 it is understood that the circular recesses 309 could be located along a non-common circumferential location between the top and bottom of band 290 also.

Figure 49:
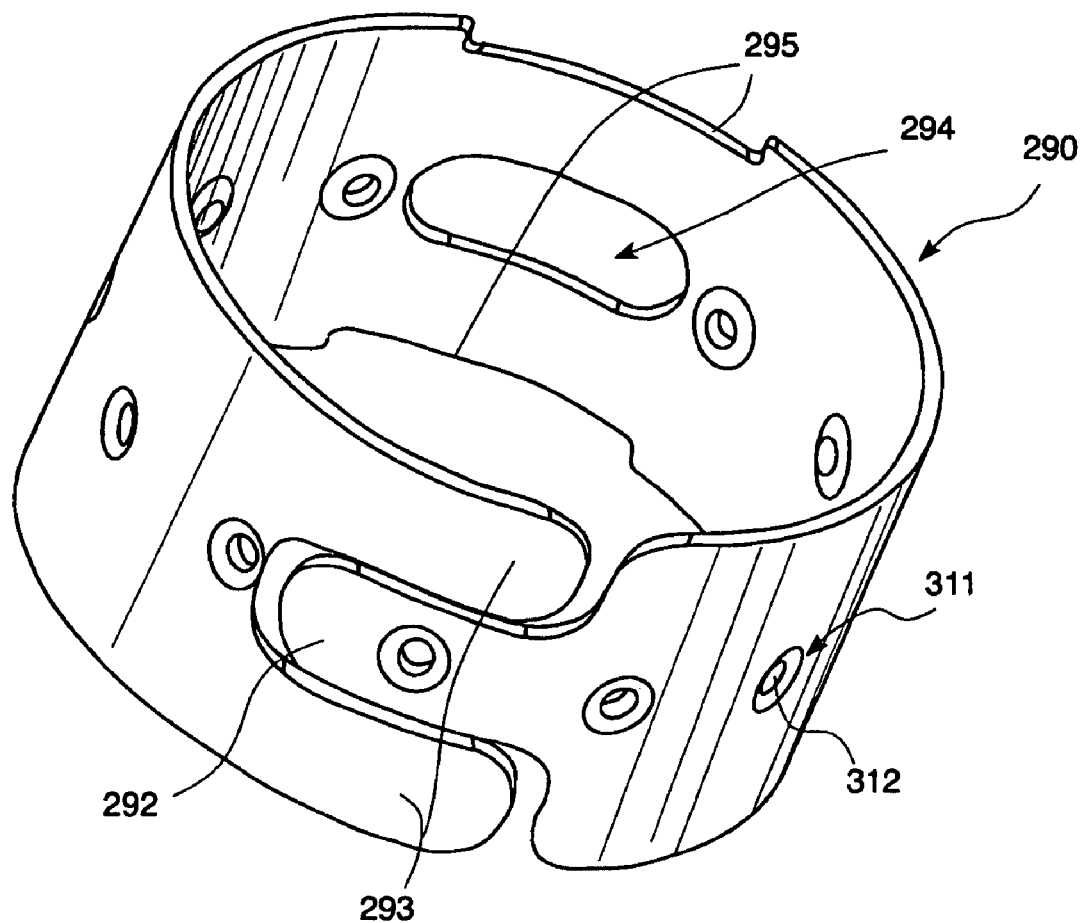
FIG. 49 shows a perspective view of one embodiment of a band having an oblong hole, cut outs, finger and lands and one row of punch holes with thru holes.

FIG. 49 shows a band 290 having finger 292 and lands 293 with hole 294 and cutouts 295 with one row of punch holes 311 around the circumference of the band 290. The punch holes 311 are in a row and evenly spaced around the circumference of the band 290. The punch holes 311 have a thru hole 312 in the center and are convex on the inside diameter and concave on the outside diameter of the band 290.

While FIG. 49 shows a specific number of punch holes 311 with thru holes 312 evenly spaced, it should be understood that more or punch holes 311 with thru holes 312 could be incorporated into the band 290 and the spacing would not necessarily need to be even nor the same distance between the top and bottom of the band 290. The spacing and number of the punch holes 311 with thru holes 312 would depend on the particular application of the damper on which the band 290 is used.

Figure 50:
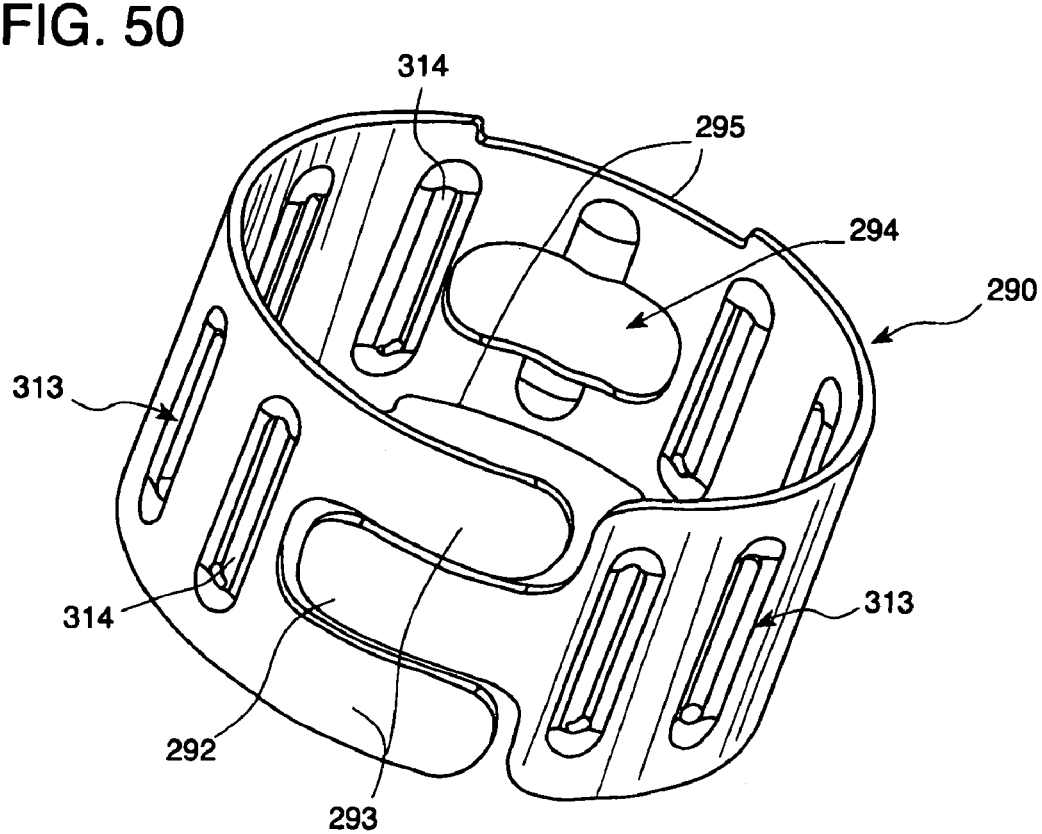
FIG. 50 shows a perspective view of one embodiment of a band having an oblong hole, cut outs, finger and lands and one row of punch slots with thru slots.

FIG. 50 shows a band 290 having finger 292 and lands 293 with hole 294 and cutouts 295 with one row of vertical punch slots 313 around the circumference of the band 290. The vertical punch slots 313 are in a row and evenly spaced around the circumference of the band 290. The vertical punch slots 313 have a thru slot 314 in the center and are convex on the inside diameter and concave on the outside diameter of the band 290.

While FIG. 50 shows a specific number of punch slots 313 with thru slots 314 evenly spaced, it should be understood that more or fewer punch slots 313 with thru slots 314 could be incorporated into the band 290 and the spacing would not necessarily need to be even nor the same distance between the top and bottom of the band 290. The spacing and number of the punch slots 313 with thru slots 314 would depend on the particular application of the damper on which the band 290 is used.

By varying the type, location, number, diameter and cross section of the bands 290 and grooves 258 and by varying the number and types of angles of slots 254, as well as the type and hardness of the polymer used, various levels of radial force and therefore damping of spring S can be achieved depending upon the design application for the damper 250. Damping of the valve spring S can be increased or decreased over specific rpm levels to lessen valve spring oscillations, the flutter or float of the valve and decrease the noise attributed to the valve and valve springs S.

It will now be apparent to those skilled in the art that other embodiments, improvements, details and uses can be made consistent with the letter and spirit of the foregoing disclosure and within the scope of this application.

What is claimed is:

1. A device for damping oscillations in a spring and providing a seal for a valve stem, the device comprising:
   a damper having a top and a bottom and an inner surface and an outer surface;
   at least one slot extending from a slot end near the bottom and extending to the top;
   a hole located in the bottom centered on an axis and a stem seal centered on the axis,
   the stem seal extending from near the bottom and extending toward the top;
   a spring land located near the bottom between the inner surface and the stem seal, the spring land perpendicular to the axis;
   the stem seal for sealing the damper and the valve stem;
   a plurality of upper tabs located near the top on the outer surface;
   a plurality of lower tabs located near the bottom on the outer surface such that a groove is formed between the upper tabs and the lower tabs in the outer surface;
   the groove for receiving a band, the band having a cut and a hole in the band opposite the cut; and
   the band biasing the inner surface of the damper against the spring to dampen spring oscillations.

2. The device of claim 1, further comprising:
   the upper tabs and lower tabs are offset radially from one another around the axis.

3. The device of claim 1, wherein:
   the number of upper tabs are eight and the number of lower tabs are four.

4. The device of claims 1, wherein:
   the number of lower tabs are eight and the number of upper tabs are four.

5. The band of claim 1, further comprising:
   a cutout located above and below the hole.

6. The band of claim 1 wherein:
   the opening in the band is a finger and two lands.

7. The band of claim 1 wherein:
   the opening in the band is an s-cut.

8. The band of claim 1 wherein:
   the opening in the band is a v-cut.

* * * * *